US012343722B2

(12) United States Patent
Lin et al.

(10) Patent No.: US 12,343,722 B2
(45) Date of Patent: Jul. 1, 2025

(54) REAGENT CARTRIDGES FOR IN-VITRO DEVICES

(71) Applicant: MGI Holdings Co., Limited, Shenzhen (CN)

(72) Inventors: Sz-Chin Lin, San Jose, CA (US); Jian Gong, Danville, CA (US); Yiwen Ouyang, San Jose, CA (US); Yan-You Lin, Fremont, CA (US)

(73) Assignee: MGI Holdings Co., Limited, Shenzhen (CN)

(*) Notice: Subject to any disclaimer, the term of this patent is extended or adjusted under 35 U.S.C. 154(b) by 629 days.

(21) Appl. No.: 17/631,086

(22) PCT Filed: Jul. 28, 2020

(86) PCT No.: PCT/CN2020/105030
§ 371 (c)(1),
(2) Date: Jan. 28, 2022

(87) PCT Pub. No.: WO2021/018111
PCT Pub. Date: Feb. 4, 2021

(65) Prior Publication Data
US 2022/0250062 A1 Aug. 11, 2022

Related U.S. Application Data

(60) Provisional application No. 62/879,990, filed on Jul. 29, 2019.

(51) Int. Cl.
*B01L 3/00* (2006.01)
*B01L 9/00* (2006.01)

(52) U.S. Cl.
CPC ......... *B01L 3/502715* (2013.01); *B01L 3/527* (2013.01); *B01L 9/54* (2013.01);
(Continued)

(58) Field of Classification Search
CPC ...... B01L 3/502715; B01L 3/527; B01L 9/54; B01L 2200/027; B01L 2200/16;
(Continued)

(56) References Cited

U.S. PATENT DOCUMENTS 4,925,065 A 5/1990 Golias
2005/0181519 A1* 8/2005 Karg .................... B01F 35/882 422/514

(Continued)

FOREIGN PATENT DOCUMENTS

CN 1852755 A 10/2006
CN 103175975 A 6/2013

(Continued)

OTHER PUBLICATIONS

European Application No. 20846715.9, Extended European Search Report mailed on Jun. 27, 2023, 7 pages.

(Continued)

*Primary Examiner* — Jennifer Wecker
*Assistant Examiner* — Britney N. Washington
(74) *Attorney, Agent, or Firm* — Kilpatrick Townsend & Stockton LLP

(57) ABSTRACT

A method and device for displacing fluid from a reagent cartridge (310) into a microfluidic device (320) and for loading the fluid into the reagent cartridge (310). The reagent cartridge (310) may include a cartridge body and a pipette array with pipette tips (315) to engage inlets of a microfluidics or other cartridge, wherein the pipette tips (315) correspond in position to the plurality of inlets (325) of the microfluidic device (320). Fluid may be loaded into or displaced from the microfluidic device (320) by a system of plungers (615). The reagent cartridge may alternatively include blisters (925) having fluid reservoirs and dispensing tips (930), each dispensing tip (930) including a pathway (Continued)

(927) that is fluidly coupled to a blister (925). The fluid may be displaced from or loaded into the blister (925) via the dispensing tip (930). A deformable seal (910) may be overlaid on the blisters (925) to seal the volumes of fluid within the blisters (925), and may be deformed to displace the fluid.

21 Claims, 19 Drawing Sheets

(52) U.S. Cl.
CPC ..... *B01L 2200/027* (2013.01); *B01L 2200/16* (2013.01); *B01L 2300/0816* (2013.01); *B01L 2300/0829* (2013.01); *B01L 2400/0478* (2013.01); *B01L 2400/0481* (2013.01); *B01L 2400/0683* (2013.01)

(58) Field of Classification Search
CPC ..... B01L 2300/0816; B01L 2300/0829; B01L 2400/0478; B01L 2400/0481; B01L 2400/0683
See application file for complete search history.

(56) References Cited

U.S. PATENT DOCUMENTS

| | | | | |
|---|---|---|---|---|
| 2012/0190032 | A1* | 7/2012 | Ness | G01N 35/085 435/6.12 |
| 2013/0288873 | A1 | 10/2013 | Barbee et al. | |
| 2015/0133345 | A1 | 5/2015 | Handique et al. | |
| 2015/0147195 | A1 | 5/2015 | Young et al. | |
| 2016/0184826 | A1* | 6/2016 | Nemoto | B01L 3/52 436/66 |
| 2016/0230214 | A1 | 8/2016 | Barbee et al. | |
| 2017/0144160 | A1 | 5/2017 | Ness et al. | |
| 2018/0154364 | A1 | 6/2018 | Handique et al. | |
| 2019/0054471 | A1 | 2/2019 | Williams et al. | |
| 2019/0120868 | A1* | 4/2019 | Amorese | G01N 35/1002 |

FOREIGN PATENT DOCUMENTS

| | | | |
|---|---|---|---|
| CN | 104204229 | A | 12/2014 |
| CN | 105408466 | A | 3/2016 |
| CN | 107427833 | A | 12/2017 |
| EP | 2891887 | A1 | 7/2015 |
| EP | 3026437 | A1 | 6/2016 |
| JP | 0950593 | A | 2/1997 |
| JP | 11118811 | A | 4/1999 |
| JP | 11271325 | A | 10/1999 |
| JP | 2007523330 | A | 8/2007 |
| JP | 2008089440 | A | 4/2008 |
| WO | 2015077412 | A1 | 5/2015 |
| WO | 2018111234 | A1 | 6/2018 |

OTHER PUBLICATIONS

International Application No. PCT/CN2020/105030, International Preliminary Report on Patentability mailed on Feb. 10, 2022, 6 pages.

International Application No. PCT/CN2020/105030, International Search Report and Written Opinion mailed on Oct. 30, 2020, 10 pages.

Application No. CN202080053275.5, Office Action, Mailed on May 6, 2025, 21 pages, English translation on pp. 1-7.

* cited by examiner

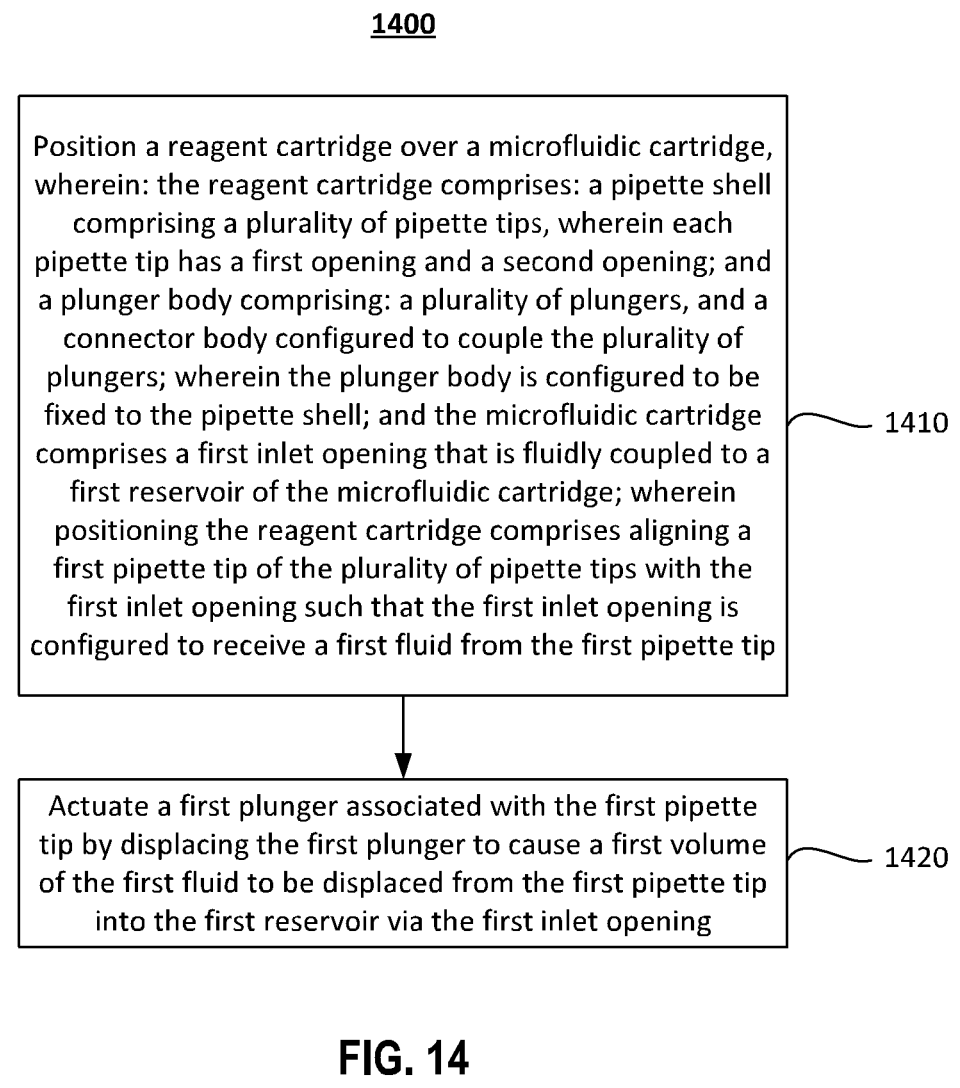

1400

Position a reagent cartridge over a microfluidic cartridge, wherein: the reagent cartridge comprises: a pipette shell comprising a plurality of pipette tips, wherein each pipette tip has a first opening and a second opening; and a plunger body comprising: a plurality of plungers, and a connector body configured to couple the plurality of plungers; wherein the plunger body is configured to be fixed to the pipette shell; and the microfluidic cartridge comprises a first inlet opening that is fluidly coupled to a first reservoir of the microfluidic cartridge; wherein positioning the reagent cartridge comprises aligning a first pipette tip of the plurality of pipette tips with the first inlet opening such that the first inlet opening is configured to receive a first fluid from the first pipette tip — 1410

Actuate a first plunger associated with the first pipette tip by displacing the first plunger to cause a first volume of the first fluid to be displaced from the first pipette tip into the first reservoir via the first inlet opening — 1420

FIG. 14

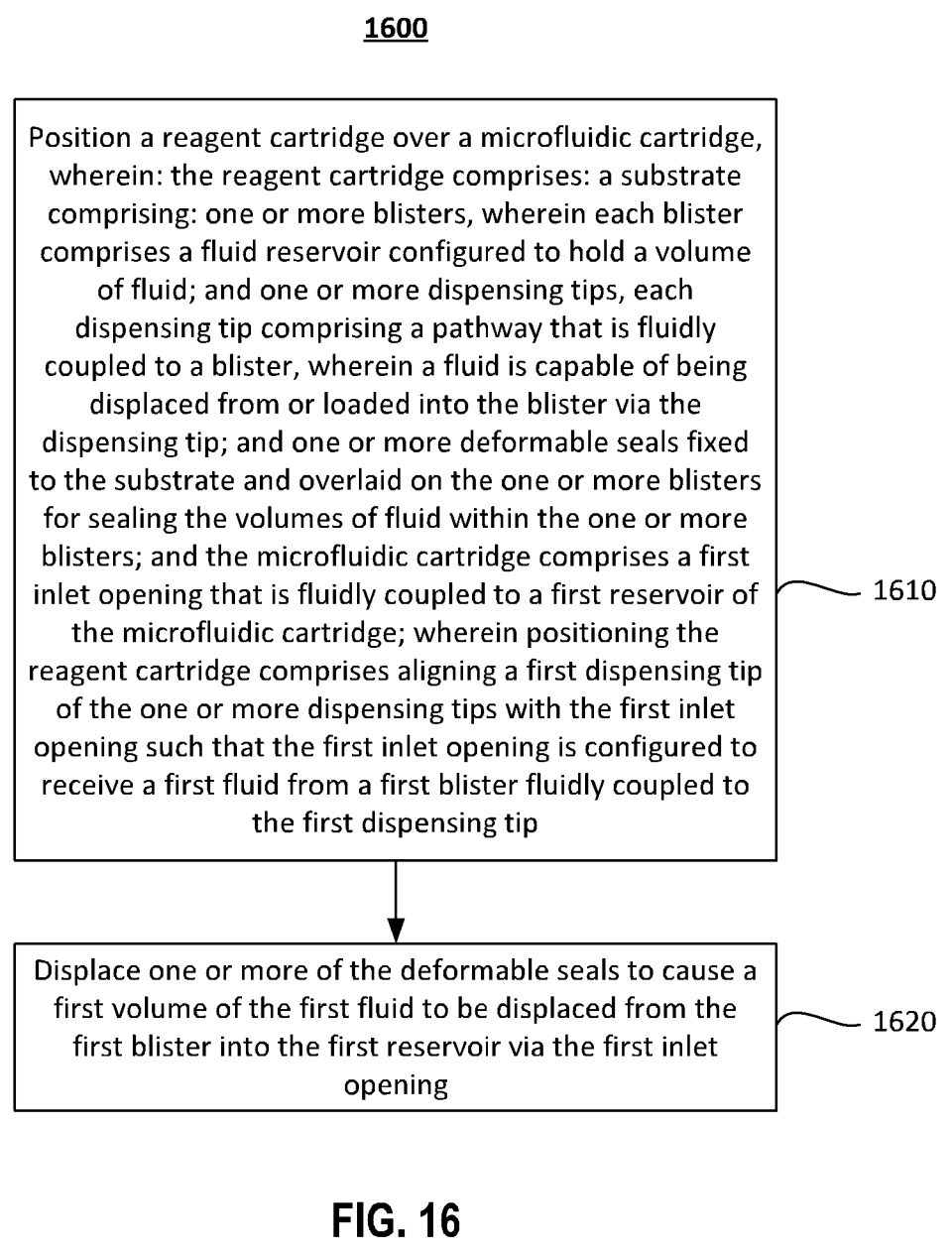

1600

Position a reagent cartridge over a microfluidic cartridge, wherein: the reagent cartridge comprises: a substrate comprising: one or more blisters, wherein each blister comprises a fluid reservoir configured to hold a volume of fluid; and one or more dispensing tips, each dispensing tip comprising a pathway that is fluidly coupled to a blister, wherein a fluid is capable of being displaced from or loaded into the blister via the dispensing tip; and one or more deformable seals fixed to the substrate and overlaid on the one or more blisters for sealing the volumes of fluid within the one or more blisters; and the microfluidic cartridge comprises a first inlet opening that is fluidly coupled to a first reservoir of the microfluidic cartridge; wherein positioning the reagent cartridge comprises aligning a first dispensing tip of the one or more dispensing tips with the first inlet opening such that the first inlet opening is configured to receive a first fluid from a first blister fluidly coupled to the first dispensing tip — 1610

↓

Displace one or more of the deformable seals to cause a first volume of the first fluid to be displaced from the first blister into the first reservoir via the first inlet opening — 1620

FIG. 16

REAGENT CARTRIDGES FOR IN-VITRO DEVICES

CROSS-REFERENCES TO RELATED APPLICATIONS

This application is a national phase application of PCT Application No. PCT/CN2020/105030, filed Jul. 28, 2020, which claims priority to U.S. Provisional Patent Application No. 62/879,990, filed Jul. 29, 2019, entitled "Reagent Cartridges For In-Vitro Devices," which is commonly assigned and incorporated by reference in its entirety herein for all purposes.

RELATED FIELDS

Devices and methods of introducing fluids into in-vitro devices, and more particularly relate to reagent cartridges for storing and transferring fluids.

BACKGROUND

As diagnostics and DNA sequencing technologies have advanced, there has been an upward trend in miniaturization of in-vitro devices such that assays and reactions may be performed within small microfluidic devices. Such miniaturized in-vitro devices have been particularly useful in reducing costs of reagents as well as space requirements. They have also been useful in automating biochemistry assays, which may otherwise be labor- and time-intensive. Microfluidic cartridges have been particularly prevalent in the diagnostics and DNA sequencing field, with MEMS and lab-on-a-chip devices capable of precisely conducting and analyzing a large number of biochemistry assays on a single cartridge. Microfluidics deals with the behavior, precise control, and manipulation of fluids that may be geometrically constrained to a small, typically sub-millimeter, scale at which capillary penetration governs mass transport.

Polymerase chain reaction (PCR) is a method widely used in molecular biology to amplify, or make many copies of, a target DNA segment. Using PCR, copies of DNA sequences are exponentially amplified to generate thousands to millions of more copies of that particular DNA segment. Techniques such as PCR may be useful for applications such as DNA sequencing, diagnostics applications, or gene editing. PCR may require a variety of different reagents to successfully amplify a target DNA segment.

DNA sequencing is the process of determining the nucleic acid sequence, or the order of nucleotides in DNA. It includes any method or technology that is used to determine the order of the four base nucleotides: adenine, guanine, cytosine, and thymine. Knowledge of DNA sequences has become indispensable for basic biological research, and in numerous applied fields such as medical diagnosis, biotechnology, forensic biology, virology and biological systematics. Comparing healthy and mutated DNA sequences can diagnose different diseases including various cancers, characterize antibody repertoire, and can be used to guide patient treatment. Having a quick way to sequence DNA allows for faster and more individualized medical care to be administered, and for more organisms to be identified and cataloged.

BRIEF SUMMARY

In this patent, we describe devices, systems, and methods for efficiently introducing fluids such as reagents into microfluidic devices (e.g., microfluidic cartridges, or any other suitable devices where one or more reactions or assays may be conducted) using a reagent cartridge. A reagent cartridge may be a cartridge that is separate from the microfluidic device that may be used to store or transfer fluids from one location to another. In this patent, we also describe devices, systems, and methods for loading the fluids into the reagent cartridge.

The miniaturization of in-vitro devices (e.g., diagnostic devices, DNA sequencing devices, DNA library preparation devices) that integrate biochemistry assays on one or more microfluidic devices (e.g., microfluidic cartridges) introduce challenges that may not exist for more conventional assays. For example, many miniaturized in-vitro devices may require on-demand release of the reagents at once or in sequence based on the specific assay requirements, and at the same time may require reliable storage of multiple reagents of different volumes. We have discovered that it is advantageous in many cases for manufacturers to provide solutions to end-users where reagents are preloaded such that the end-user does not need to individually measure out and load reagents directly into microfluidic devices, particularly when there are a large number of reagents that may require precise measurements. However, for many applications, the miniaturized in-vitro devices (e.g., a microfluidic cartridge) may be incompatible with the storage conditions (e.g., −20 degrees Celsius or −80 degrees Celsius) or the packaging processes (e.g., degassing or heat staking) of the reagents. We have developed reagent cartridges that can be stored separately from the microfluidic cartridge. When an end-user requires the reagents, the reagent cartridge may be engaged with the in-vitro diagnostic device (e.g., a microfluidic cartridge) to deliver the reagents on demand.

Embodiments disclosed herein may offer a number of advantages over more conventional solutions. For example, the reagent cartridges may be a universal plug-based interface for engaging with a socket-design (e.g., an inlet that receives dispensing tips of the reagent cartridges) on the in-vitro device (e.g., a microfluidic cartridge), delivering all or a plurality of different reagents with only one or a couple of mechanical actuations. Such an interface may provide convenience, and may reduce the time and effort required for introducing reagents to an in-vitro device. As such, it may reduce the need for highly trained operators, which may further reduce costs. Relatedly, the predetermined volumes provided by the reagent cartridges may also reduce the risk of errors. As another example, the reagent cartridges may provide flexibility to store several (e.g., up to 30 reagents) in one single cartridge. As such, these reagent cartridges may be shipped as "reaction kits," including for example all reagents necessary for a particular type of reaction, such as PCR, thereby making it convenient and easy to use. Embodiments disclosed herein may also offer other advantages that may become apparent from the description below. As another example, the universal plug-based interface may be able to accommodate different reagent volume configurations (e.g., by adjusting dimensions of pipettes or reservoirs of the reagent cartridge), providing flexibility of implementing different assays to the same microfluidic device. As another example, during manufacturing, the reagent cartridge can be easily and quickly filled with multiple reagents in a one-step sealing process. As another example, the configurations disclosed herein may be suitable for enabling the use of low cost, injection molded parts in the manufacture of the reagent cartridge. As such, it may be feasible to use these reagent cartridges as disposable consumables, which not only increases convenience, but also reduces risk of contamination. As another example, in direct contrast to other solutions such as pipettes, at least some of the reagent cartridges described herein can be filled with reagents by the manufacturer under highly controlled conditions and shipped with the reagents such that no calibration is required.

In some embodiments, a reagent cartridge may comprise a cartridge body; and a pipette array comprising a plurality of pipette tips configured to engage a plurality of inlets of a microfluidic cartridge (or other microfluidic device), wherein the pipette tips correspond in position to the plurality of inlets of the microfluidic cartridge.

In some embodiments, a reagent cartridge may comprise a pipette array comprising a plurality of pipette tips. The reagent cartridge may further comprise a plunger body comprising: a plurality of plungers, wherein each plunger may be configured to engage a fluid within a respective pipette tip and displace a volume of the fluid from the respective pipette tip or load a volume of the fluid into the respective pipette tip. The plungers may be sized to fit within respective pipette tips. The plungers may comprise an elastomer coating. Each plunger may be configured to form a seal with its respective pipette tip. The plunger body may further comprise a connector body configured to couple the plurality of plungers, wherein the plunger body may be configured to be fixed to the pipette array. Each pipette tip may have a first opening and a second opening, and wherein each pipette tip is configured to hold a volume of fluid that is capable of being displaced from or loaded into the pipette tip via the second opening. The plunger may engage the fluid via the first opening.

In some embodiments, the pipette array may be disposed within a pipette shell. In some embodiments, the pipette shell may comprise one or more projections and/or grooves that are configured to be a retention feature to align the plungers to their respective pipette tips. In some embodiments, the pipette shell may comprise one or more grooves and the plunger body comprises one or more projections, wherein the grooves are configured to receive the projections.

In some embodiments, the reagent cartridge may further comprise a seal plate configured to seal one or more of the second openings of the pipette tips to seal respective fluids within the pipette tips. In some embodiments, the seal plate may be configured to be fixed to the pipette shell. In some embodiments, one or more fluids may be stored in sealed within one or more of the pipette tips (e.g. using the seal plate). The seal plate may comprise a pliable seal material fixed to a cover base. The cover base may be configured to be removably fixed to the pipette shell such that the pliable seal material is pushed against a distal portion of the pipette tips. For example, the pliable seal material may be pushed against the one or more second openings of the pipette tips, or may include apertures that push against the outer wall of the pipette tip. The pliable seal material may comprise an elastomer. The cover base may comprise a thermoplastic material.

In some embodiments, the pipette tips may be configured to be positioned over a microfluidic cartridge (or other suitable microfluidic device). Each pipette tip may be configured to engage an inlet opening of the microfluidic cartridge that is fluidly coupled to a respective reservoir of the microfluidic cartridge. In some embodiments, positioning the reagent cartridge may comprise aligning a first pipette tip of the plurality of pipette tips with a first inlet opening of a microfluidic cartridge such that the first inlet opening is configured to receive a first fluid from the first pipette tip. In some embodiments, a first plunger associated with the first pipette tip may be actuated to cause a first volume of the first fluid to be displaced from the first pipette tip into the first reservoir via the first inlet opening of the microfluidic cartridge. In some embodiments, positioning the reagent cartridge may comprise aligning the first pipette tip with the first inlet opening and further aligning a second pipette tip with a second inlet opening. A first plunger may be actuated to cause the first volume of the first fluid to be displaced from the second pipette tip into a second reservoir of the microfluidic device via the second inlet opening. A second plunger may be actuated to cause a second volume of a second fluid to be displaced from the second pipette tip into a second reservoir of the microfluidic cartridge via the second inlet opening. The first plunger and the second plunger may be actuated simultaneously or sequentially. In some embodiments, the first volume may be different from the second volume. In other embodiments, the first volume may be the same as the second volume. In some embodiments, positioning a pipette tip may comprise lowering the pipette tip into a respective inlet opening, wherein the respective inlet opening may be disposed on a lid of the microfluidic device.

In some embodiments, a first plunger may be coupled to a first position lock that is configured to move the first plunger by a user-set distance and prevent actuation of the first plunger beyond the user-set distance. In some embodiments, a first plunger may be configured to be actuated by a loading deck configured to move the first plunger by a user-set distance. In some embodiments, each plunger is operable to be actuated individually. In some embodiments, two or more plungers are operable to be actuated in concert.

In some embodiments, reagents may be loaded onto a reagent cartridge. In some embodiments, the reagent cartridge may be positioned over a well plate that comprises a first well. Positioning the reagent cartridge may comprise immersing a first pipette tip of the reagent cartridge in a first fluid contained in the first well. A first plunger associated with the first pipette tip may be actuated to cause a first volume of the first fluid to be transferred from the first well into the first pipette tip. Positioning the reagent cartridge over the well plate may comprise aligning the first pipette tip to receive the first fluid from the first well and a second pipette tip to receive a second fluid from a second well of the well plate. The first plunger and a second plunger associated with the second pipette tip may be actuated to cause a second volume of the second fluid to be transferred from the second well to the second pipette tip. In some embodiments, actuating the first plunger may comprise displacing plungers manually, wherein the pipette tips may comprise one or more markings indicating fluid volumes to determining a desired volume to be transferred. The first plunger in the second plunger may be actuated simultaneously or sequentially. In some embodiments, the first volume may be different from the second volume. In some embodiments, the first volume may be the same as the second volume. In some embodiments, one or more seals (e.g., a seal plate) may be fixed to the reagent cartridge, wherein the seals are configured to seal one or more of the second openings of one or more of the pipette tips after one or more desired volumes of fluid have been transferred to each of the one or more pipette tips.

In some embodiments, a reagent cartridge may include a filler-fluid reservoir and a filler-fluid dispensing tip, wherein the filler-fluid reservoir is configured to accept a filler fluid and convey the filler fluid to the filler-fluid dispensing tip, wherein the filler-fluid dispensing tip is configured to be aligned with a corresponding filler-fluid inlet of the microfluidic device. A user may introduce the filler fluid into the filler-fluid reservoir, and the filler fluid may be conveyed into the corresponding filler-fluid inlet by gravity.

In some embodiments, a reagent cartridge may comprise a substrate comprising one or more blisters, wherein each blister comprises a fluid reservoir configured to hold a volume of fluid. In some embodiments, the blisters may comprise hollow cavities inner surface of the substrate. The reagent cartridge may further comprise one or more dispensing tips, each dispensing tip comprising a pathway that is fluidly coupled to a blister. In some embodiments, a fluid may be capable of being displaced from the blister via the dispensing tip. In some embodiments, a fluid may be capable of being introduced into the blister via the dispensing tip (or via any other suitable entry point, such as a dedicated port). In some embodiments, the reagent cartridge may further comprise one or more deformable seals covering the fluid reservoirs, wherein the one or more deformable seals may seal the volumes of fluid within the one or more blisters.

In some embodiments, the one or more deformable seals may comprise a thermoplastic film (e.g., a thermoplastic elastomer film). In some embodiments, the substrate may comprise a plurality of blisters organized in a blister array, and wherein the one or more deformable seals comprise a single deformable film that overlays the blister array. In some embodiments, the plurality of blisters may comprise a first blister having a first fluid reservoir and a second blister having a second fluid reservoir.

In some embodiments, the reagent cartridge may further comprise a base configured to engage one or more openings of the one or more dispensing tips and form a seal. In some embodiments, the base may comprise one or more recessed portions configured to house at least a portion of the dispensing tips. In some embodiments, the base may further comprise one or more sealing pads disposed within the one or more recessed portions, wherein each sealing pad is configured to engage and seal an opening of a respective dispensing tip. In some embodiments, the one or more deformable seals may comprise a thermoplastic film. In some embodiments, the one or more deformable seals may comprise a thermoplastic elastomer film. In some embodiments, the one or more deformable seals may comprise a coating configured to reduce gas permeability. In some embodiments, the one or more deformable seals may be fixed to the substrate by laser welding or thermal lamination. In some embodiments, the one or more deformable seals may be fixed to the substrate using a pressure-sensitive adhesive.

In some embodiments, a first blister may be configured to receive a first plunger end and may further be configured to displace a first volume of fluid from the first blister via a first dispensing tip when the first plunger end is received. In some embodiments, the first dispensing tip may be configured to be disposed within an inlet opening of a microfluidic cartridge. In some embodiments, the first plunger end may conform to a shape and size of the fluid reservoir of the first blister. In some embodiments, the substrate may comprise a plurality of blisters, wherein the plurality of blisters may comprise a first blister having a first fluid reservoir and a second blister having a second fluid reservoir, and wherein the first plunger end may conform to a shape and size of the fluid reservoir of the first blister and a second plunger end may conform to a shape and size of a fluid reservoir of the second blister.

In some embodiments, a reagent cartridge may be used to introduce fluid into a microfluidic device (e.g., microfluidic cartridge) by displacing a first deformable seal of a reagent cartridge, wherein the reagent cartridge comprises: a substrate comprising: one or more blisters, wherein each blister comprises a fluid reservoir configured to hold a volume of fluid; and one or more dispensing tips, each dispensing tip comprising a pathway that is fluidly coupled to a blister, wherein a fluid is capable of being displaced from or loaded into the blister via the dispensing tip; and one or more deformable seals fixed to the substrate and overlaid on the one or more blisters for sealing the volumes of fluid within the one or more blisters. In some embodiments, displacing the first deformable seal may cause a first volume of a first fluid to be displaced from a first blister of the one or more blisters via a first dispensing tip.

In some embodiments, an integrated cartridge may comprise a blister array comprising a plurality of fluid reservoirs and dispensing tips, the dispensing tips configured to connect to a plurality of reagent inputs of a microfluidic cartridge; one or more deformable seals covering the fluid reservoirs. Deformation of the one or more deformable seals proximate one of the fluid reservoirs may dispense fluid from one of the dispensing tips associated with the fluid reservoir.

In some embodiments, a first blister of the reagent cartridge may be configured to receive a first volume of fluid from a dispensing needle via an opening of a first dispensing tip.

This summary is provided to introduce the different embodiments of the present disclosure in a simplified form that are further described in detail below. This summary is not intended to be used to limit the scope of the claimed subject matter. Other features, details, utilities, and advantages of the claimed subject matter will be apparent from the following detailed description.

BRIEF DESCRIPTION OF THE DRAWINGS

FIG. 14 illustrates an example method for transferring reagents to a microfluidic device (e.g., a microfluidic cartridge).

FIG. 16 illustrates an example method for transferring reagents to a microfluidic cartridge.

DETAILED DESCRIPTION

Figure 1:
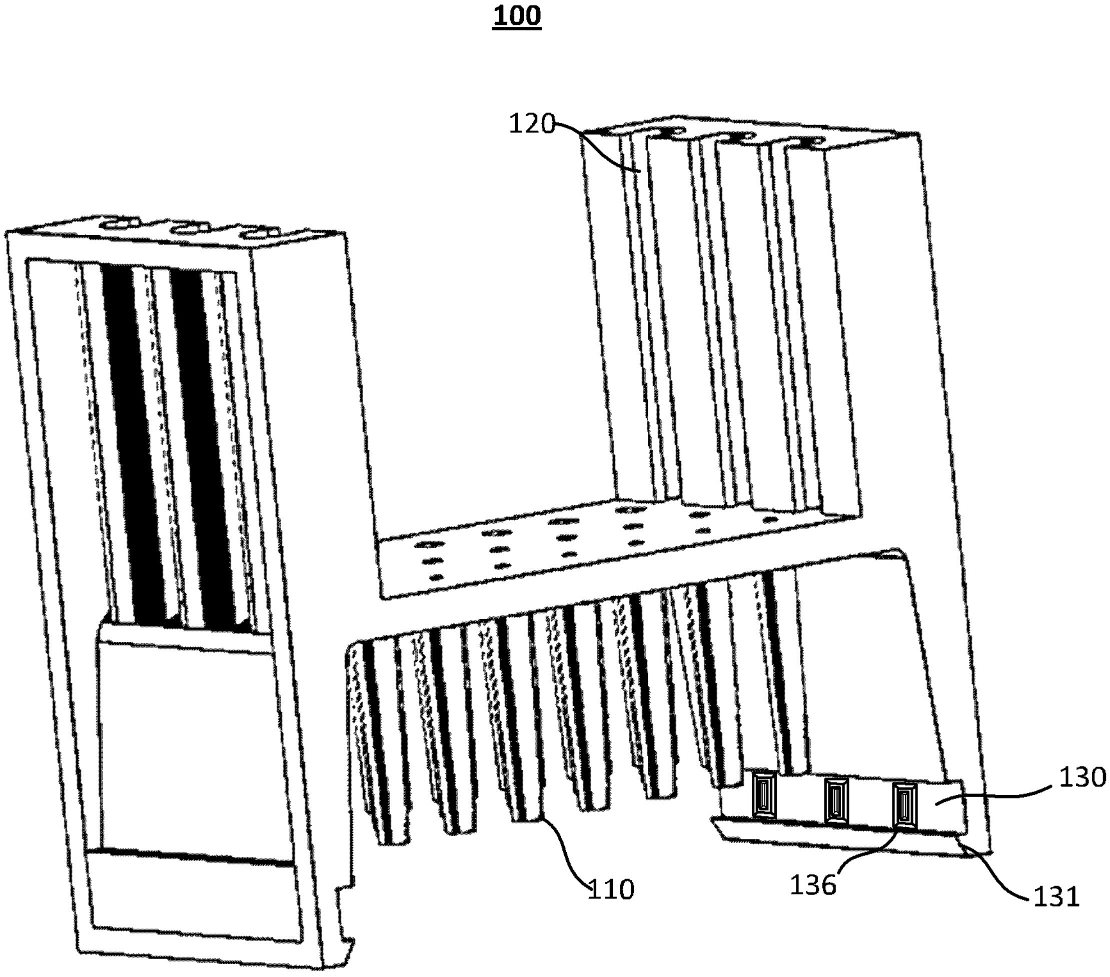
FIG. 1 illustrates an example of a pipette array of a reagent cartridge.

It will be appreciated that for simplicity and clarity of illustration, elements shown in the Figures have not necessarily been drawn to scale. For example, the dimensions of some of the elements are exaggerated relative to each other for clarity. Further, where considered appropriate, reference numerals have been repeated among the Figures to indicate corresponding elements.

In the following detailed description, reference is made to the accompanying drawings which form a part hereof, and in which is shown by way of illustration specific embodiments in which the invention may be implemented. The terms "height," "top," "bottom," etc., are used with reference to the orientation of the figures being described. Because components of embodiments of the present invention can be positioned in a number of different orientations, the term is used for purposes of illustration and is not limiting.

The term "reagent" refers to a substance used to induce or otherwise facilitate a reaction. In some embodiments, example reagents may include reagents that are useful for performing PCR (polymerase chain reactions) on a microfluidic cartridge. For example, such reagents may include any combination of buffer solutions, PCR primer, DNA samples, enzyme such as polymerase, oil, and/or a solution containing magnetically responsive beads (e.g., for transporting DNA samples).

Figure 2A:
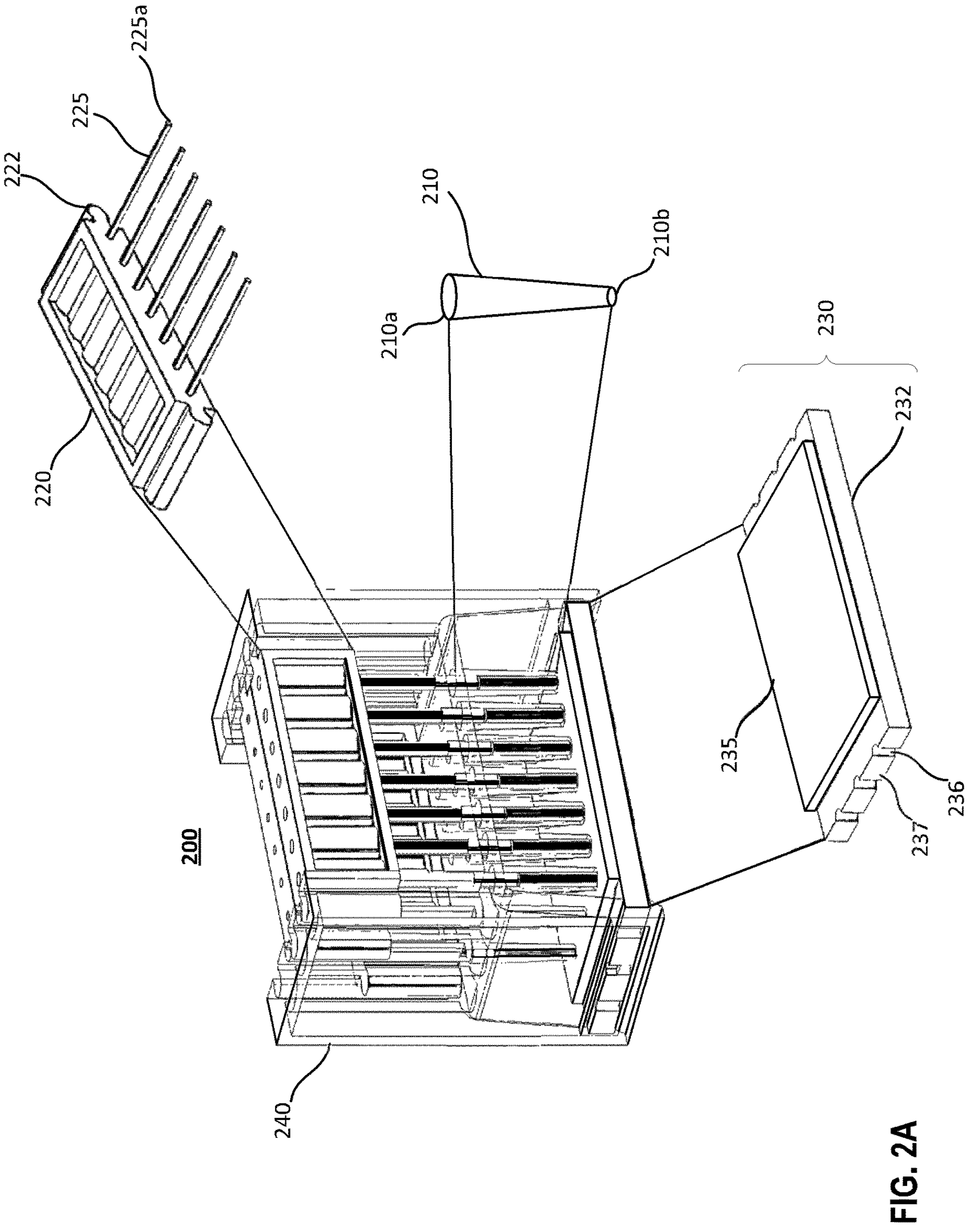
FIG. 2A illustrates the pipette array of FIG. 1 as part of an integrated reagent cartridge.
Figure 3:
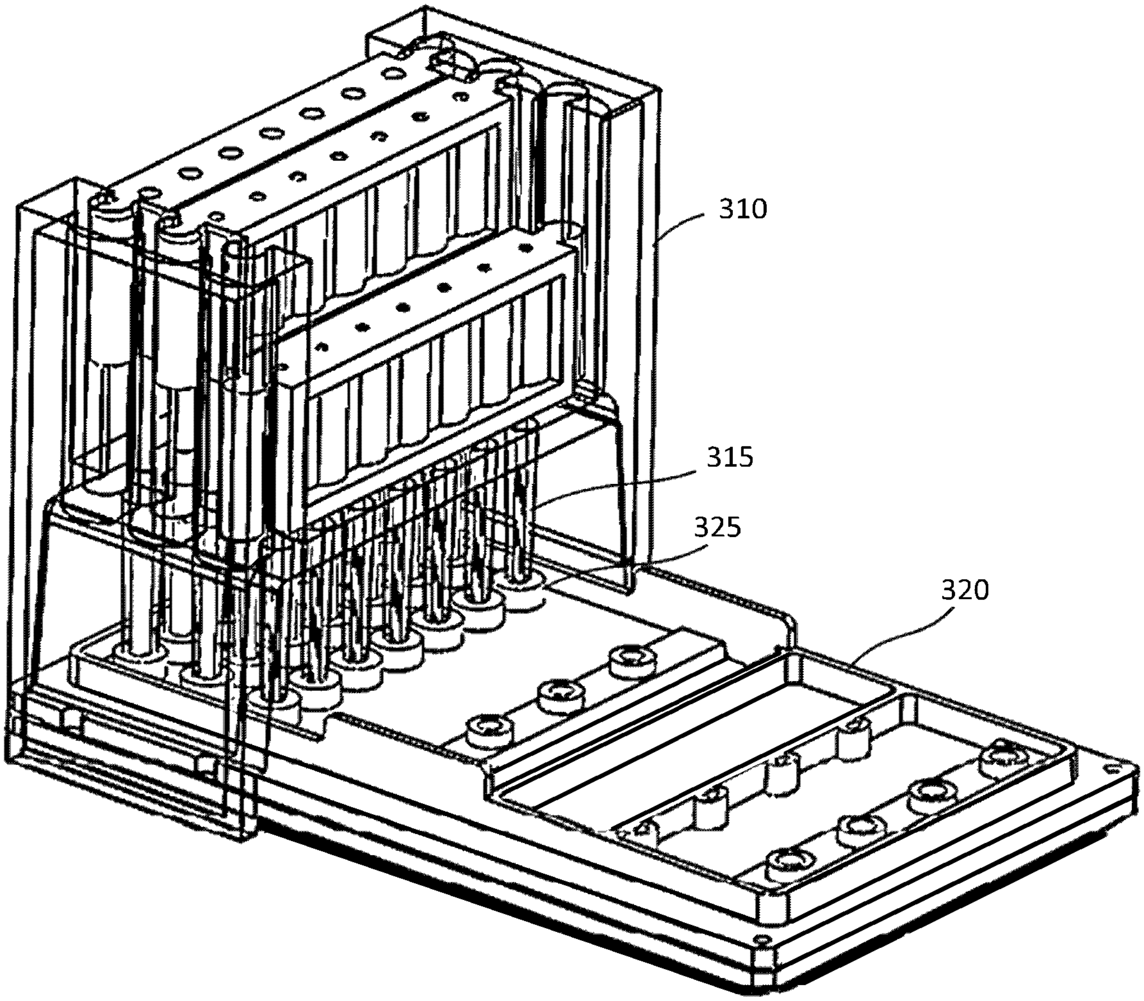
FIG. 3 illustrates an example of an integrated reagent cartridge attached to a microfluidic cartridge.

FIG. 1 illustrates an example of a pipette array of a reagent cartridge. In some embodiments, a reagent cartridge may include a pipette array with a plurality of pipette tips. For example, referencing FIG. 1, a reagent cartridge may include a plurality of pipette tips 110 arranged in several rows. The pipette tips may be arranged in the pipette array to correspond in position to a plurality of inlets of a microfluidic device (e.g., a microfluidic cartridge), such as shown in FIG. 3. In some embodiments, the pipette tip may include a lumen that is configured to hold a fluid, such as a reagent. In some embodiments, the plurality of pipette tips may be configured to engage a plurality of inlets of a microfluidic cartridge. For example, the tips may be configured to extend into walls of the inlets. In some embodiments, the pipette array may be a portion of a pipette shell, which may be a housing that is configured to be integrated with other elements to form an integrated reagent cartridge. For example, referencing FIG. 1, the pipette tips 110 or part of the pipette shell 100. The pipette shell 100 may have one or more retention features to integrate and retain other elements. In some embodiments, these retention features may be configured to guide and align the other elements to their appropriate positions with respect to the pipette shell 100. For example, as illustrated in FIG. 1, the pipette shell 100 may include grooves 120 and 130, which may be configured to receive one or more projections or ridges from other elements and thereby retain the other elements. Also as illustrated in FIG. 1, the pipette shell 100 may include ancillary projections 131 associated with the grooves 130 that may be used to provide additional support in retaining an element. In some embodiments, the ancillary projections may be extended to provide increased levels of support. As another example, the pipette shell 100 may include one or more projections or ridges for fitting into grooves of the other elements. In some embodiments, as illustrated in FIG. 1, the pipette shell may include projections 136 that may fit into grooves of an element that is retained therein FIG. 2A illustrates the pipette array of FIG. 1 as part of an integrated reagent cartridge. In some embodiments, referencing FIG. 2A, the integrated reagent cartridge may include a plunger body that includes a plurality of plungers 225. In some embodiments, the plunger body may also include a connector body 220 that is configured to couple the plurality of plungers 225. Each plunger may be coupled to a pipette for displacing fluid from a respective pipette tip or for introducing fluid into the pipette tip. Referencing FIG. 2A is an example, each plunger 225 may include a plunger tip 225*a*, and an actuation end (hidden within the connector body 220 in FIG. 2A) that may be engaged (e.g., pushed and/or pulled) to actuate the plunger 225. For example, the plunger tip 225*a* may be configured to enter the pipette tip 210 via a first opening 210*a* and engage a fluid therein. Pushing the actuation end displaces the fluid via the second opening 210*b* of the pipette tip 210. As another example, the actuation end may be pulled while the second opening 210*b* is immersed in a fluid, resulting in the fluid being drawn into the pipette tip 210. In some embodiments, the plunger tip 225*a* may include a widened portion (e.g., an element with a larger surface area than a main body of the plunger) for ensuring a tight seal between the plunger and the interior wall of the pipette tip. In some embodiments, multiple plungers may be coupled to a single actuation element, which may be a point of actuation that makes the multiple plungers capable of being simultaneously actuated with a single push or pull at the actuation end. For example, two plungers within two different pipette tips may be coupled to a single actuation element that may be pushed (or pulled) to displace fluid from (or load fluid into) both of the two pipette tips simultaneously.

Any suitable means may be used to push or pull a plunger to displace a desired volume of fluid from the reagent cartridge or to load a desired volume of fluid into the reagent cartridge. In some embodiments, the length of a plunger can be in the tens of centimeters range. The diameter of the plunger may range from 1 mm to several millimeters. The dimensions of the lumens of the pipette tips may correspond to the dimensions of the plungers. The volume of fluid that is displaced from (or loaded into) a pipette tip may be calculated based on a distance a respective plunger is moved. In some embodiments, a plunger may be moved using a loading deck with a step motor that has a resolution of, for example, 0.025 mm/step. In this example, fluid may be displaced (or loaded) in increments as small as 0.02 μL. Thus by moving the plunger by a couple of centimeters, a delivery of tens of microliters of fluid can be achieved. In some embodiments, a plunger may be actuated manually by a user. For example, a plunger may be coupled to a position lock that is configured to move the plunger by a user-set distance and prevent actuation of the first plunger beyond the user-set distance. In this example, a user may specify that the plunger is to move by a distance of 0.025 mm (or that the plunger is to displace a fluid volume of 0.02 μL). The user may then actuate the plunger by pushing it (or pulling it) until the plunger hits the position lock, causing the displacement of (or introduction of) 0.02 μL of fluid. In some embodiments, the pipette tips may have markings indicating fluid volumes, such that a user may be able to manually actuate the plungers to displace (or loaded) the desired volume. In some embodiments, the volumes within each pipette tip may be pre-measured to include desired volumes such that a user may simply be able to push down plungers all the way to empty the entire contents of pipette tips. This may be particularly convenient for the user. In some embodiments, different pipette tips may have different interior volumes such that they have different maximum capacities. For example, a first set of pipettes in a pipette array may have a volume of 10 μL, while a second set of pipettes may have a volume of 20 μL. In some embodiments, different sets of pipettes may be dimensioned to allow for different volumes of reagents as needed. For example, a first set of pipettes may be dimensioned for a first reagent, while a second set of pipettes may be dimensioned for a second reagent.

In some embodiments, the plunger tip 225*a* of a plunger may be sized and shaped such that it fits within a lumen of a corresponding pipette tip. In some embodiments, the plunger tip 225*a* may form a seal against the inner walls of a corresponding pipette tip. The plungers may include a material that is configured to improve a seal between the plunger and the inner walls of the pipette tips to prevent fluid from leaking past the fluid-engaging and 225*a*. For example, the plunger may include a stainless steel material with an over-molded elastomer coating or layer (e.g., TPU) that pushes against the inner walls of the pipette tips to allow for a better seal. In some embodiments, the connector body 220 may include a thermoplastic with a low shrink rate such as ABS or PC.

In some embodiments, the reagent cartridge may be configured to hold the plunger body in alignment with the pipette array. For example, as illustrated in FIG. 2A, the connector body 220 of the plunger body may include one or more projections 222 on opposing ends that may fit into corresponding grooves of the pipette shell 240 (e.g., referencing FIG. 1, the grooves 120 on opposing sides of the pipette shell 100). In this example, an assembler may insert the projections 222 into the grooves 120 at the top of the pipette shell 100 and slide down the connector body 220 into place. Having this groove-projection mechanism in the example shown in FIG. 2A is advantageous in that it not only serves to retain the plunger body, it acts as a guide mechanism for aligning the plunger body. In some embodiments, multiple such connector bodies may be fixed to a pipette shell. For example, referencing FIG. 1, the pipette shell 100 includes three sets of grooves 120 that may receive a maximum of three separate connector bodies. In some embodiments, a manufacturer or user may opt to not fix a maximum number of connector bodies to a pipette shell. For example, as illustrated in FIG. 2A, a manufacturer may opt to insert only two connector bodies 220 into the pipette shell 240, even though the pipette shell 240 may include grooves for three connector bodies 220.

In some embodiments, the pipette tips of the integrated reagent cartridge may be pre-loaded by a manufacturer or other suitable entity and sealed before being sent to a user. This may reduce the risk of user error that may occur from the added task of filling pipettes with requisite fluids. This may be particularly advantageous for some cases requiring a pipette array with multiple different fluids. For example, performing series of PCR reactions on a microfluidic cartridge may require a pipette array with a number of different reagents. Manual loading of each pipette in a required sequence introduces the possibility of user error (e.g., loading the wrong reagent in a pipette, loading an incorrect volume of reagent). Furthermore, pre-loaded reagent cartridges significantly increase convenience by eliminating the loading step. In some embodiments, the reagent cartridges may be pre-loaded by the user at a different time and sealed for later use. This may be advantageous in some instances in that it may allow the user to run many sequences of reactions with reagent cartridges without having to expend time and effort loading reagents into pipettes at the time of running one or more reactions.

In some embodiments, the sealing mechanism for sealing fluid inside the pipette tips is a seal plate configured to seal one or more of the second openings of the pipette tips. For example, referencing FIG. 2A, the reagent storage cartridge 200 includes a seal plate 230. The seal plate 230 may be configured to be fixed to the pipette shell 240. In the example shown in FIG. 2A, the seal plate includes a pliable seal material 235 fixed to a cover base 232. In this example, the seal plate includes retention features 237 configured to removably fix the seal plate 230 to the pipette shell 240. More specifically, in this particular example, the retention features 237 may be snapped into corresponding features of the pipette shell 240 (e.g., referencing FIG. 1, the grooves 130 on opposing sides of the pipette shell 100). In some embodiments, the seal plat may also include grooves 236 into which the projections 136 of the pipette shell illustrated in FIG. 1 may fit so as to secure the seal plate. The seal plate 230 may be configured such that when it is fixed to be pipette shell 240, the pliable seal material 235 is pushed against the second openings 210*b* of the pipette tips, thereby sealing any fluids present inside the pipette tips 210. In some embodiments, the pliable seal material 235 may include an elastomer (e.g., silicone, polyurethane). In some embodiments, the cover base 232 may include one or more thermoplastics such as ABS, PMMA, or PC. In some embodiments, the pliable seal material 235 may be fixed to the cover base by overmolding or by using a layer of double-sided pressure sensitive adhesive.

Figure 2C:
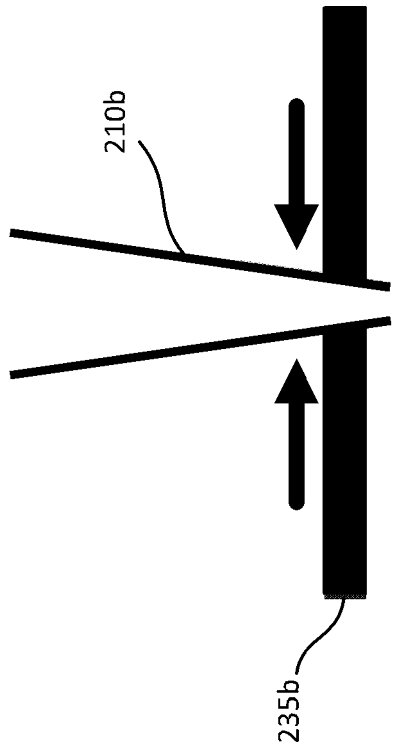
FIGS. 2B-2C illustrate example pipette-tip sealing mechanisms.
Figure 2B:
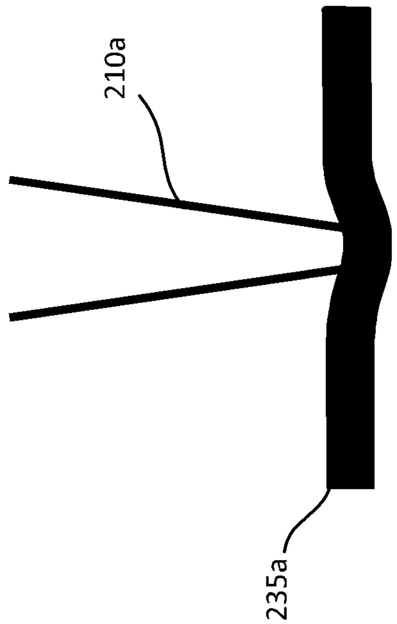

FIGS. 2B-2C illustrate close-ups of example pipette-tip sealing mechanisms. FIG. 2B illustrates an example sealing mechanism comprising a pliable seal material 235*a* similar to the pliable seal material 235 of FIG. 2A, against which an opening of a pipette tip 210*a* is pushed to ensure that the fluid therein is sealed. FIG. 2C illustrates another example sealing mechanism comprising a seal material 235*b* (which may or may not be pliable) which may include one or more apertures configured such that distal portions of one or more pipette tips 210*b* may be inserted therein. As illustrated in FIG. 2C, when the pipette tip 210*b* is appropriately inserted, the seal material 235*b* may be configured to push radially inward against the outer wall of the distal portion of the pipette tip 210*b*, thereby narrowing the pipette tip sufficiently so as to seal the fluid within the pipette tip 210*b*. FIGS. 2B-2C do not illustrate a separate seal plate (such as the seal plate 230 illustrated in FIG. 2B), but the disclosure contemplates that such a seal plate may be secured to the bottom of the seal materials 235*a* and 235*b*.

FIG. 3 illustrates an example of an integrated reagent cartridge 310 attached to a microfluidic cartridge 320. In some embodiments, referencing FIG. 3, an integrated reagent cartridge 310 may be connected to a microfluidic cartridge such that each of its pipette tips 315 engages an inlet opening 325 of the microfluidic cartridge. In some embodiments, each of the inlet openings 325 may be fluidly coupled to a respective reservoir of the microfluidic cartridge. In some embodiments, the integrated reagent cartridge 310 may include a retention feature that is configured to fix the reagent cartridge 310 to the microfluidic cartridge 320. For example, referencing FIG. 1, the retention feature may include the grooves 130 and the associated ancillary projections 131 on opposing sides of the pipette shell 100, and may be the same retention feature that may have been used to retain the seal plate 230. The retention feature may also include the projection 136 which may be configured to fit into respective grooves on a microfluidic cartridge. In this example, referencing FIGS. 2 and 3, a user may remove the seal plate 230 and may then fix the reagent cartridge 310 to the microfluidic cartridge 320.

As illustrated by the example of FIG. 3, the integrated reagent cartridge 310 may provide a universal plug-based interface for plugging into "sockets" (e.g., cavities defined by walls of the inlet openings 325) of a plurality of different microfluidic devices. The result is a "one-size-fits-all," universal solution for quickly and efficiently introducing a number of suitable reagents into a number of microfluidic devices in any desired combination. For example, a first reagent cartridge containing a first set of reagents may be plugged into a first microfluidic device configured to perform a biological assay or into a second microfluidic device configured to perform PCR. As another example, a first reagent cartridge containing a first set of reagents may be plugged into a first microfluidic device to perform a particular type of biological assay, and a second reagent cartridge containing a second set of reagents may be plugged into the same first microfluidic device to perform a different type of biological assay.

Figure 4:
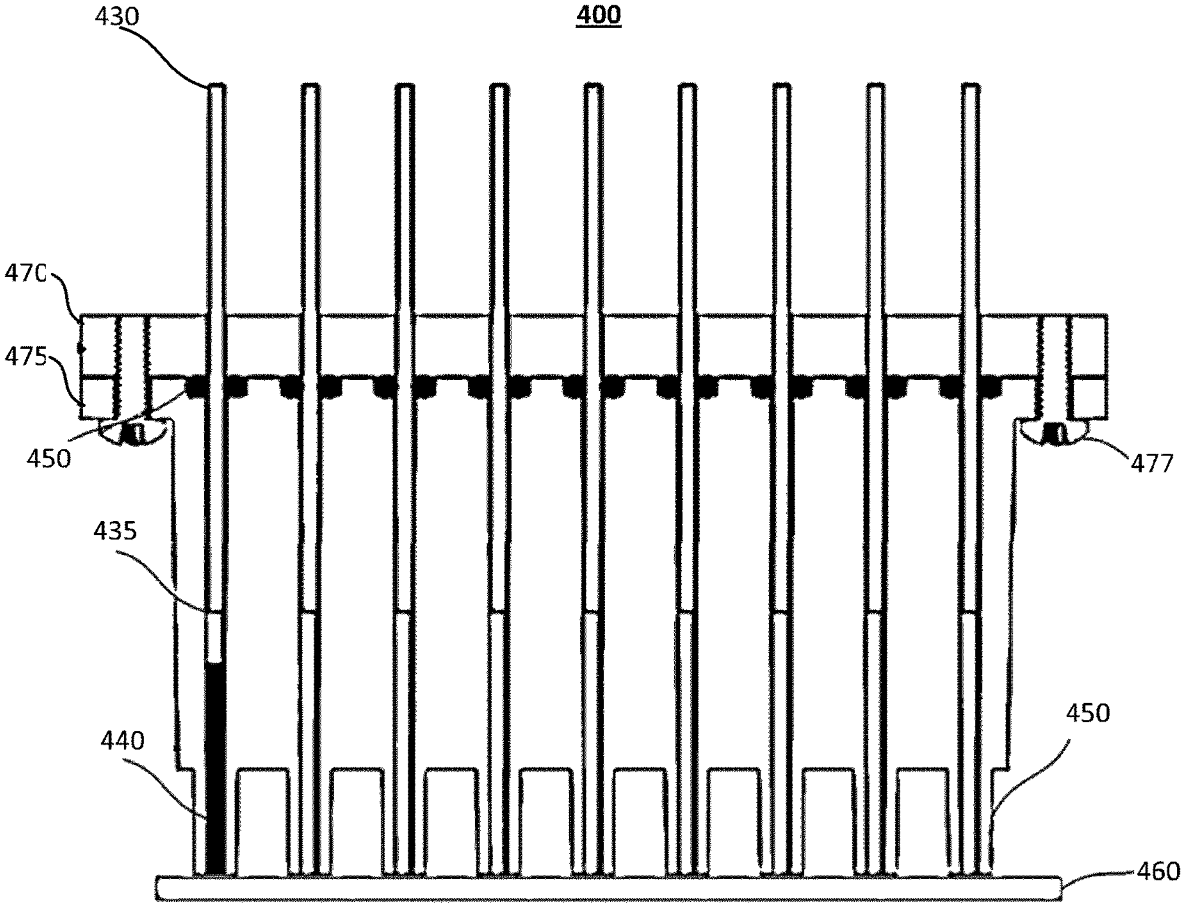
FIG. 4 illustrates another example of an integrated reagent cartridge.

FIG. 4 illustrates an example of an integrated reagent cartridge 400. The embodiment illustrated in FIG. 4 includes a lid 470 that is attached to a pipette body 475. In this illustrated example, the lid 470 is secured to the pipette body 475 by one or more screws 477. Alternatively or additionally, the lid 470 may be laser welded to the pipette body 475. In some embodiments, the pipette body 475 may be a single component that is injection-molded, and includes one or more respective lumens. In some embodiments, one or more plungers having actuation end 430 and fluid-engaging end 435 may be disposed within the one or more respective lumens of the pipette body 475. In some embodiments, the plungers may be kept in alignment with one or more seals 450. The pipette body 475 may have a plurality of pipette tips 450 that extend outward. In this example, a removable seal plate 460 seals the contents of the lumens of the pipette body 475 (e.g., the reagent 440).

Figure 5:
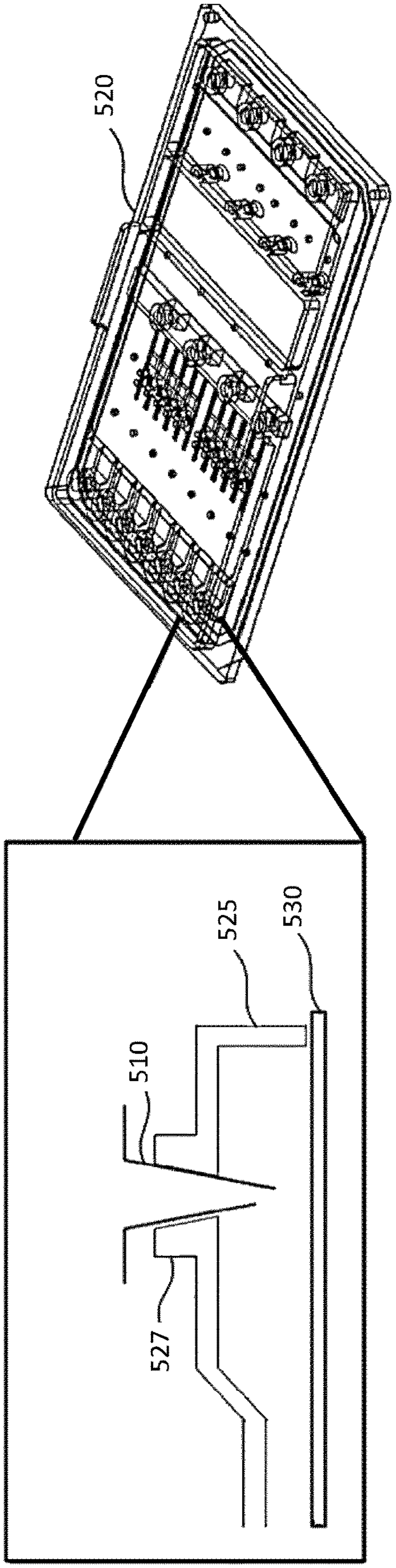
FIG. 5 illustrates a close-up view of an example of a pipette engaging an inlet of a microfluidic cartridge.

FIG. 5 illustrates a close-up view of an example of a pipette 510 engaging an inlet of a microfluidic cartridge 520. As illustrated in FIG. 5, a pipette tip 510 may be introduced into the inlet defined by the walls 527, which may project outward from the lid 525 of the microfluidic cartridge 520. At the bottom of the microfluidic cartridge may be a substrate 530 that may include a reservoir portion for receiving a fluid from the pipette tip 510 once it has been positioned. In some embodiments, the pipette tip 510 may be part of a pipette array, in which case it may be one of a plurality of pipette tips that are introduced (e.g., simultaneously) into respective inlets of the microfluidic cartridge 520.

Figure 6A:
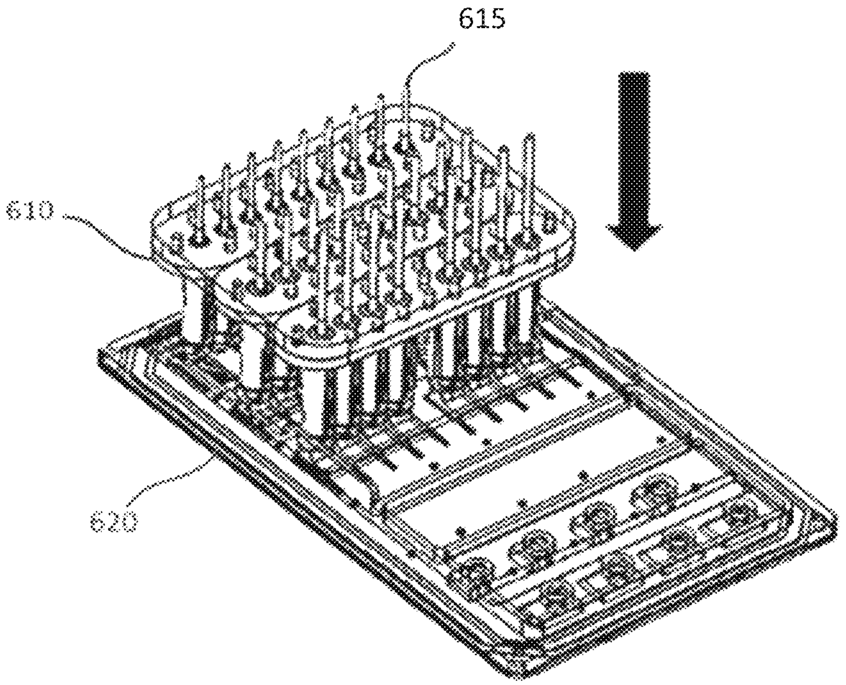
FIGS. 6A-6B illustrate an example of displacing a fluid volume into a microfluidic cartridge using a reagent cartridge.
Figure 6B:
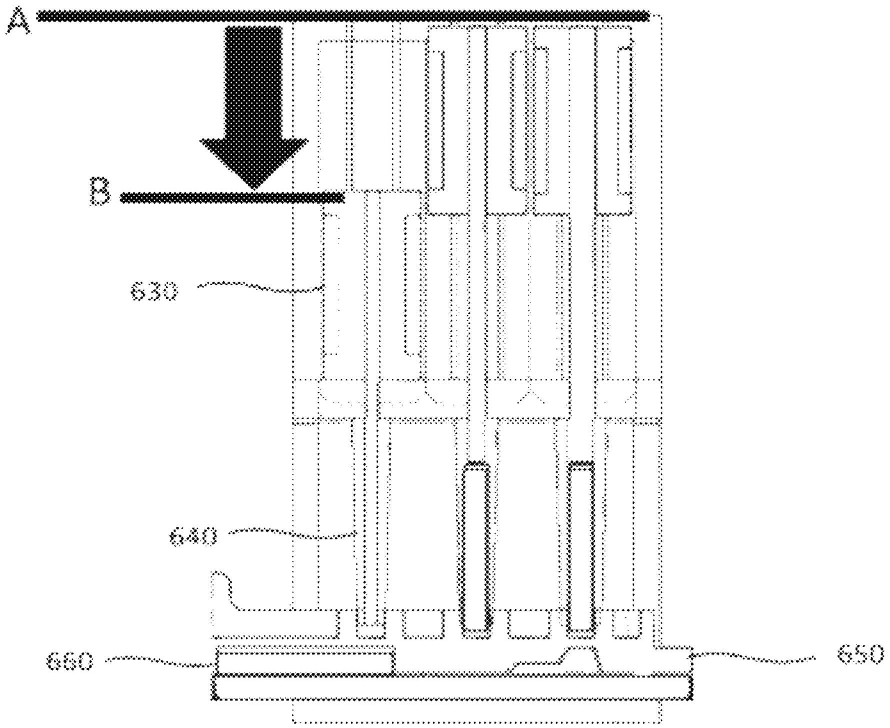

FIGS. 6A-6B illustrate an example of displacing a fluid volume into a microfluidic cartridge 620 using a reagent cartridge 610. As illustrated in FIG. 6A, the reagent cartridge 610 may be aligned such that its pipette tips are positioned to engage inlets of the microfluidic cartridge 620. One or more plungers 615 of the reagent cartridge 610 may be pushed down toward the microfluidic cartridge 620, which may cause fluid from the respective pipette tips to be displaced into the microfluidic cartridge 620 via respective inlets. FIG. 6B shows a close-up view of the interior of an example reagent cartridge, where a top portion 630 of a plunger is pushed down (e.g., via an actuation end (not shown in the figure)), for example, from a starting position A to an ending position B. This movement of the plunger may cause fluid 660 that may have been within the pipette tip 640 to be displaced into a reservoir of the microfluidic cartridge 650.

Figure 7A:
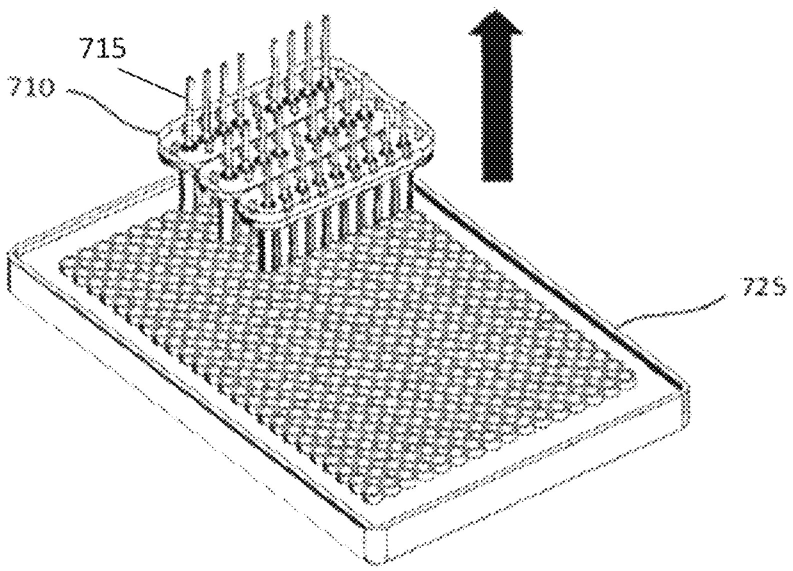
FIGS. 7A-7B illustrate an example of loading a volume of fluid into a reagent cartridge.
Figure 7B:
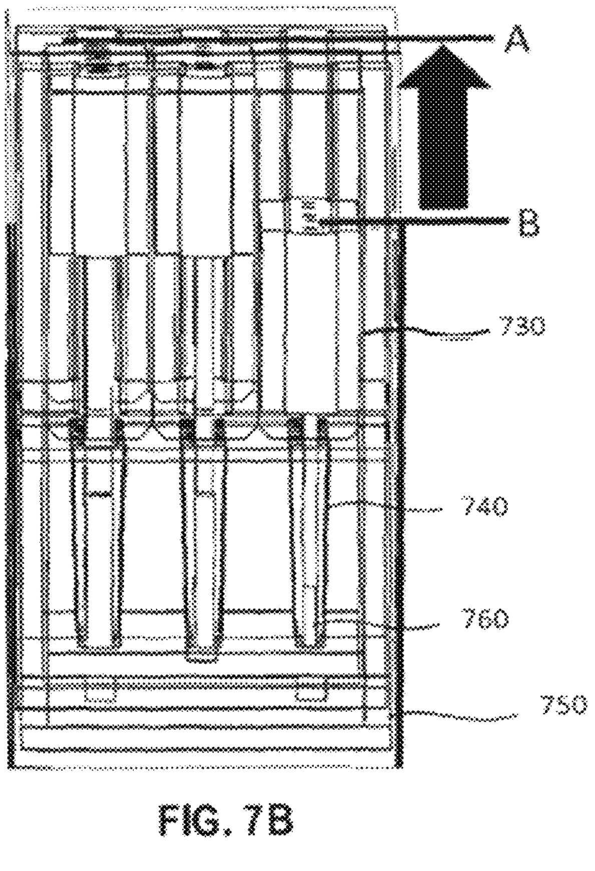

FIGS. 7A-7B illustrate an example of loading a volume of fluid into a reagent cartridge 710. As illustrated in FIG. 7A, the reagent cartridge 710 may be aligned such that its pipette tips are positioned to engage inlets of the well plate 725. One or more of its pipette tips may be submerged into fluid within one or more wells of the well plate 725. One or more plungers 715 of the reagent cartridge 710 may be pulled up from the wells of the well plate 725, which may cause fluid from the wells to be loaded into respective pipette tips of the reagent cartridge 710. FIG. 7B shows a close-up view of the interior of an example reagent cartridge, where a top portion 730 of a plunger is pulled up (e.g., via an actuation end that is not shown in the figure), for example, from a starting position B to an ending position A. This movement of the plunger may cause fluid 760 from a well of the well plate 750 to be loaded into the pipette tip 740.

Figure 8A:
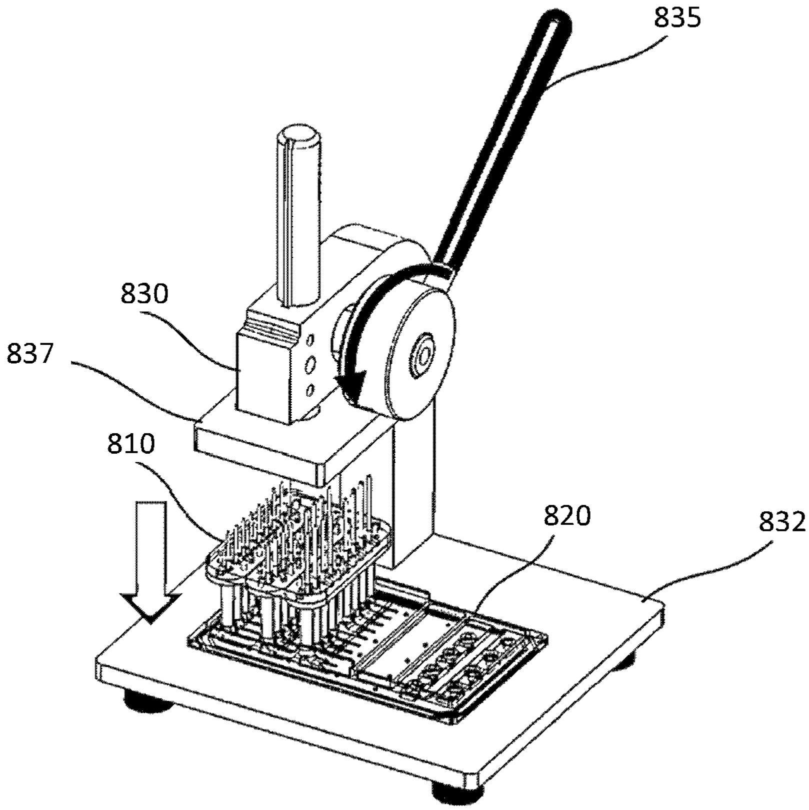
FIGS. 8A-8B illustrate an example of using a loading deck to assist with displacing or loading fluid volumes from or into a reagent cartridge.
Figure 8B:
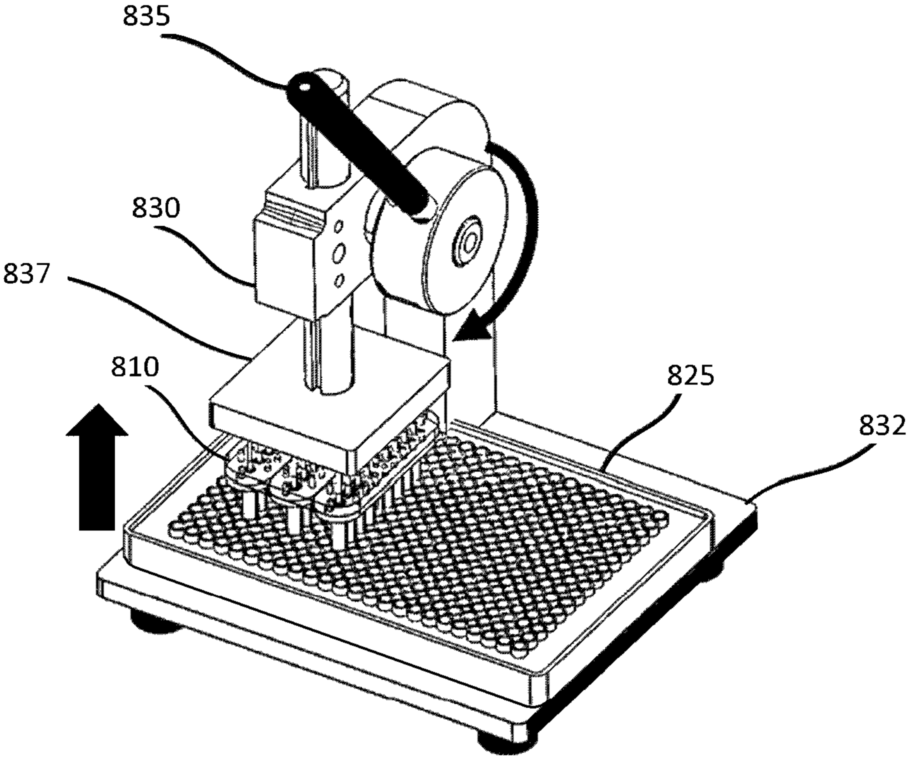

FIGS. 8A-8B illustrate an example of using a loading deck 830 to assist with displacing or loading fluid volumes from or into a reagent cartridge. In some embodiments, as illustrated in FIG. 8A, a microfluidic cartridge 820 may be placed onto a loading platform 832 of a loading deck 830. A reagent cartridge 810, which may include fluids (e.g., reagents) within one or more of its pipette tips, may be positioned over the microfluidic cartridge 820 such that one or more pipette tips of the reagent cartridge 810 may engage one or more inlets of the microfluidic cartridge 820. A lever 835 of the loading deck 830 may be actuated to cause a rotation of a mechanism of the loading deck 830, which may in turn cause an engaging surface 837 to be moved downward by a distance corresponding to the rotation. The motion of the engaging platform 837 may push the plungers of the reagent cartridge 810 downward, causing fluid within pipettes of the reagent cartridge 810 to be displaced into the microfluidic cartridge 820. In some embodiments, as illustrated in FIG. 8B, a well plate 825 may be placed onto the loading platform 832. One or more wells at the well plate 825 may include fluids (e.g., reagents). A reagent cartridge 810 may be positioned over the well plate such that one or more of its pipette tips engage wells of the well plate 825 (e.g., such that the pipette tips are at least partly immersed in fluid within the wells). The engaging surface 837 may be brought into contact with plungers of the microfluidic cartridge 810. The engaging surface 837 may be configured to grasp the plungers of the microfluidic cartridge 810. The lever 835 may be actuated (e.g., in an opposite direction to that illustrated in FIG. 8A) to cause a rotation of the mechanism of the loading deck 830, which may in turn cause the engaging surface 837 to be moved upward by a distance corresponding to the rotation, correspondingly pulling plungers of the microfluidic cartridge 810. This may ultimately result in fluid from wells of the well plate 825 being loaded into pipette tips of the reagent cartridge 810.

Figure 9A:
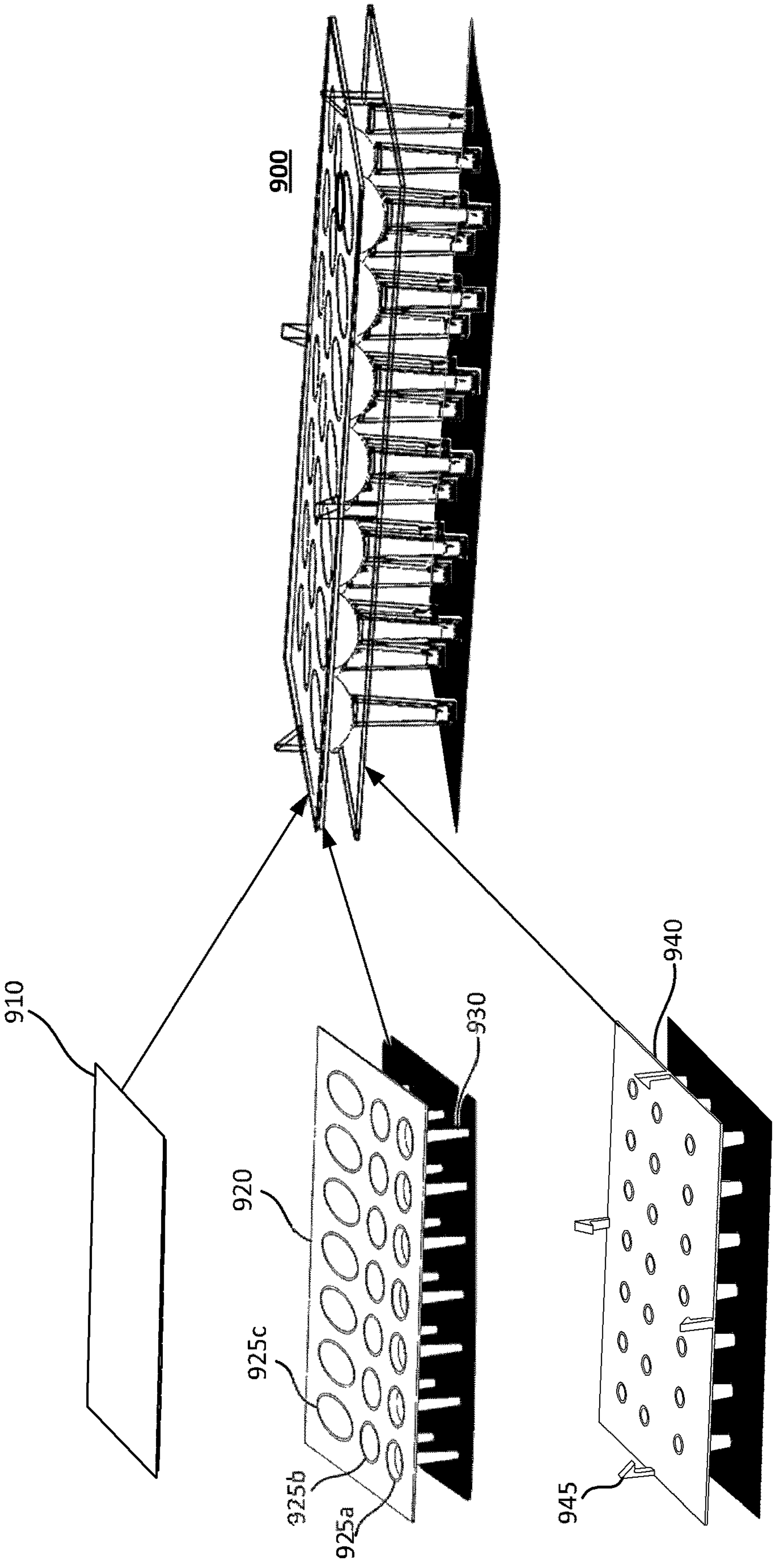
FIGS. 9A-9B illustrate an example of an integrated reagent cartridge having a blister array for convenient fluid displacement.
Figure 9B:
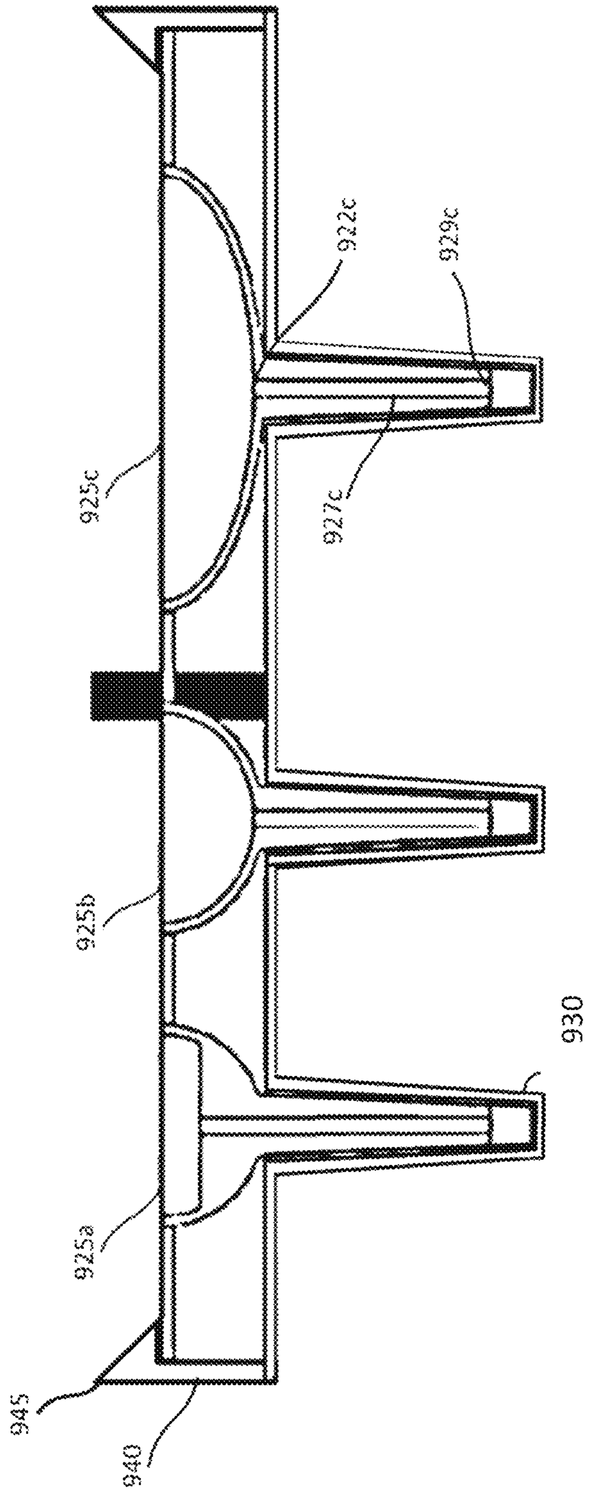

FIGS. 9A-9B illustrate an example of an integrated reagent cartridge 900 having a blister array 920 for convenient fluid displacement. In this example, an integrated reagent cartridge includes "blisters" that are configured to be fluid reservoirs for holding a fluid (e.g., a reagent) therein. In some embodiments, the blisters may be hollow cavities in a surface of a substrate. In some embodiments, the substrate may be made of a thermoplastic with good chemical compatibility such as PC, COP, or PP. As illustrated in FIG. 9A, the blisters may be dome-shaped cavities that are hollowed out in the substrate making up the blister array 920. In some embodiments, as illustrated in FIG. 9A, the blister array 920 may include a plurality of blisters (e.g., arranged in one or more rows). In some embodiments, the capacity of a blister may be controlled by varying its dimensions (e.g., depth, diameter, etc.) and/or shapes. In some embodiments, a blister array may have blisters of varying capacities. FIG. 9A shows an example embodiment of a blister array which includes three rows of differently configured blisters 925*a*, 925*b*, and 925*c*. In the illustrated example of FIG. 9A, each of these rows of blisters may have different dimensions and/or may have different shapes. For example, as illustrated in FIG. 9B, the blister 925*b* may have a smaller diameter than the blister 925*c*, resulting in the blister 925*b* having a smaller fluid capacity than blister 925*c*. Also in this example, the blister 925*a* may be configured to be shallower than blisters 925*b* and 925*c*, resulting in the blister 925*a* having a smaller fluid capacity than blisters 925*b* and 925*c*. As another example, a blister may be shaped to have a profile of a circle, and oval, a rectangle, or any other suitable shape. The blisters in a blister array may have any suitable dimensions. For example, the blisters may have an outer diameter of 4 mm to 10 mm.

In some embodiments, as illustrated in FIG. 9A, each of the blisters may be fluidly coupled to a dispensing tip 930, which may afford a pathway for dispensing the fluid located in the blister. In some embodiments, referencing FIG. 9B, a dispensing tip may have a first opening (e.g., the first opening 922*c*) adjacent to a blister (e.g., the blister 925*c*) and a second opening (e.g., the second opening 929*c*) that is distal from the blister. In some embodiments, the fluid in a blister may be dispensed from the reagent cartridge via the second opening (e.g., the second opening 929*c*) of a corresponding dispensing channel (e.g., the dispensing channel 927*c*) of a dispensing tip (e.g., the dispensing tip 930*c*). In some embodiments, the channel in each dispensing tip may have an inner diameter of several hundred microns. The dispensing tips may be of any suitable height. For example, the dispensing tips may be 8 mm to 25 mm in height.

In some embodiments, the reagent cartridge may include one or more deformable seals that overlay or otherwise cover the fluid reservoirs of the blisters. For example, as illustrated in FIG. 9A, the deformable seal 910 may be overlaid on the blister array 920. As an example, the deformable seal 910 may be a film that is attached to the blister array by laser welding, thermal lamination, or applying a pressure-sensitive adhesive. In some embodiments, the deformable seal 910 may be a thin thermoplastic film (e.g., PET, PP, PMMA, COC, COP) or a thermoplastic elastomer film (e.g., silicone, polyurethane). In some embodiments, the blisters in a blister array may be spaced apart sufficiently (e.g., 1 to several millimeters) so as to ensure enough sealing surface area between the deformable seal 910 and the surface of the blister array. For example, the blisters in a blister array may have a pitch of 4.5 mm to 9 mm. In some embodiments, a suitable coding may be added to the film to further reduce the gas permeability of the film, and thereby create a better seal. The thickness of the film may be in the range of several hundreds of microns. In some embodiments, a single film may be used for cover the fluid reservoirs of every blister in a blister array, as illustrated in FIG. 9A. In these embodiments, the footprint of the film may be around the same as the blister array. In some embodiments, the one or more deformable seals may seal the volumes of fluid within the one or more blisters.

In some embodiments, the reagent cartridge may include a blister base configured to engage one or more openings of the one or more dispensing tips of the reagent cartridge. The blister base may be used to seal the fluids within the blisters and/or dispensing tips of the reagent cartridge. For example, referencing FIG. 9A, the reagent cartridge 900 may include the blister base 940 that may be secured to cap or cover the openings of the dispensing tips 930. In this example, as illustrated, the blister base may include recessed portions dimensioned to house at least a portion of the dispensing tips 930. In some embodiments, the blister base 940 may include a retention feature to configured to secure the blister base 940 to the blister array 920. For example, as illustrated in FIG. 9B, the blister base 940 may include one or more protrusions 945 configured to snap on to the blister array 920. In some embodiments, the blister base may include one or more sealing pads disposed within the one or more recessed portions, wherein each sealing pad is configured to engage and seal an opening of a respective dispensing tip. For example, as illustrated in FIG. 9B, a sealing pad 929*c* may be disposed within a recessed portion of the blister base 940 corresponding to the blister 925*c* and configured to directly contact the second opening 929*c* of the dispensing channel 927*c* of the dispensing tip 930*c*. In some embodiments, the sealing pad may include an elastomer material such as silicone or polyurethane. In some embodiments, the blister base may include a thermoplastic such as PET, PE, PS, PP, PMMA, or PC. In some embodiments, the blister base 940 may be removed prior to use, thereby clearing the second openings of the dispensing tips 930 to allow the dispensing of fluid from respective blisters.

Figure 10A:
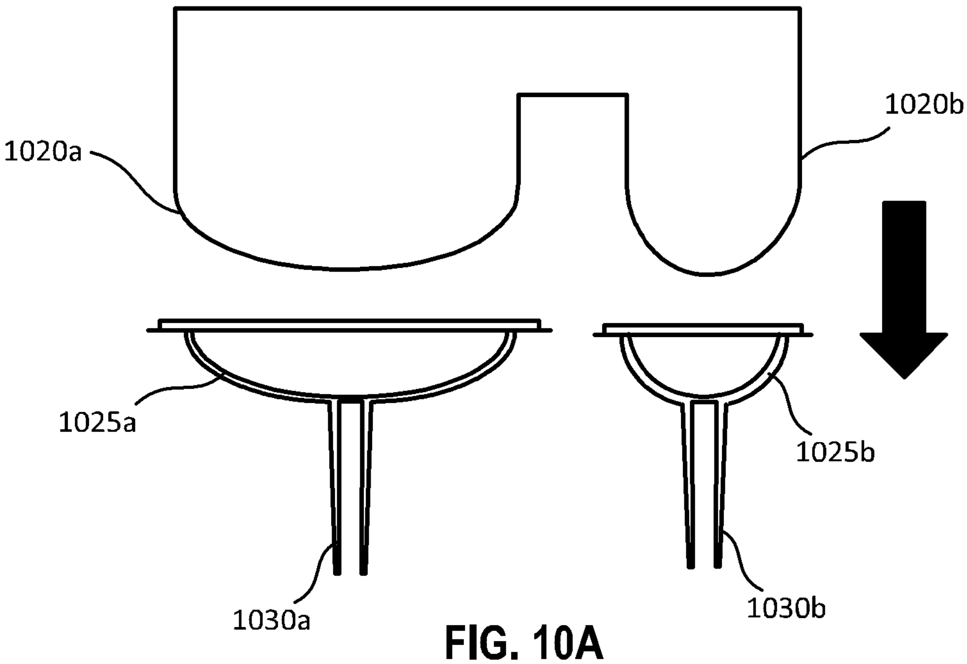
FIGS. 10A-10B illustrate an example where fluid is displaced from a blister.
Figure 10B:
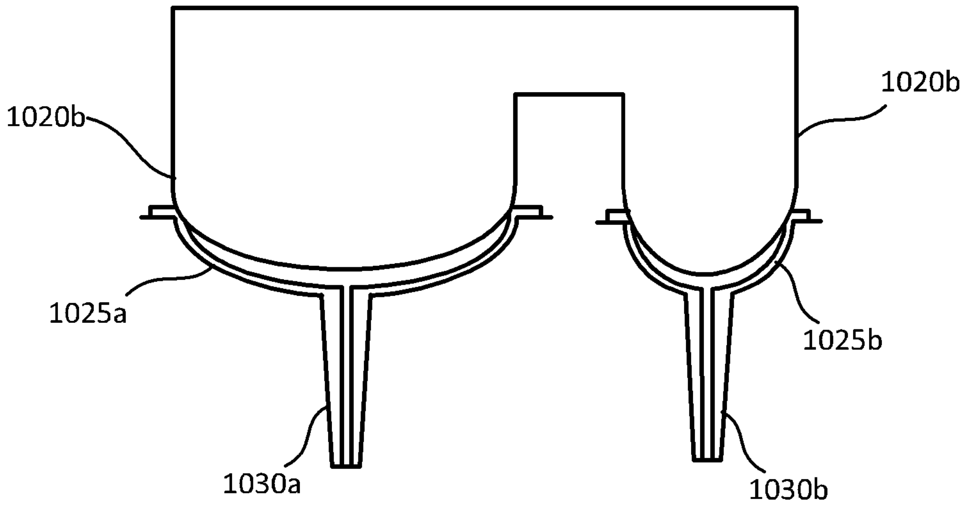

FIGS. 10A-10B illustrate an example where fluid is displaced from a blister. In some embodiments, the dispensing tips (e.g., the dispensing tips 1030*a* and 1030*b*) of a blister array may be positioned at a suitable dispensing location (e.g., inlets of a microfluidic cartridge). From this position, the fluid within one or more of the blisters (e.g., the blisters 1025*a* and 1025*b*) may be displaced into the inlet by deforming the deformable seals that cover the fluid reservoirs of the blisters. The blisters (e.g., the blisters 1025*a* and 1025*b*) may be deformed in any suitable manner. For example, as illustrated in FIGS. 10A-10B, the plungers 1020*a* and 1020*b* may be brought toward corresponding blisters 1025*a* and 1025*b* until they deform the blisters and thereby displace the fluid within such that the fluid exits via the dispensing tips 1030*a* and 1030*b*. In this example, the plungers 1020*a* and 1020*b* are shaped as ball heads dimensioned to be appropriately fit within the blisters 1025*a* and 1025*b*, so that an optimal (e.g., maximum) amount of fluid may be displaced. Elements such as plungers may be actuated by a loading deck, or alternatively may simply be moved manually by a user. In some embodiments, blisters in a blister array may be deformed individually (e.g., in a prescribed sequence) by a single plunger, or may be deformed in groups (or all together) by a single plunging structure with many integrated plungers.

Figure 10C:
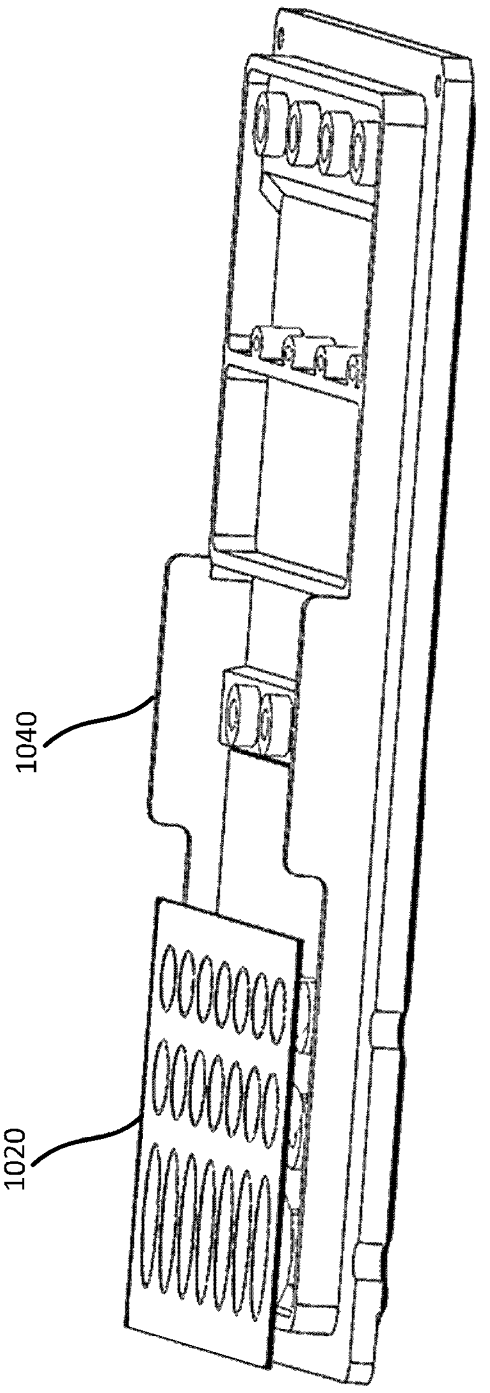
FIG. 10C illustrates an example of a blister array positioned over a microfluidic cartridge.

FIG. 10C illustrates an example of a blister array 1020 positioned over a microfluidic cartridge 1040. As illustrated in FIG. 10C, in some embodiments, a blister array 1020 may be configured to be fixed to or positioned over a microfluidic cartridge 1040, such that the dispensing tips of the blister array 1020 each correspond in position to a respective inlet of the microfluidic cartridge 1040. In these embodiments, the blister array 1020 may first be positioned over the microfluidic cartridge 1040, and then the deformable seals above one or more of the blisters of the blister array 1020 may be deformed such that the fluid within is displaced into the microfluidic cartridge 1040. For example, a user may deform a first set of blisters of the blister array 1020 to squeeze the fluid within the first set of blisters and because cause the fluid to be displaced from the blisters and into respective inlets of the microfluidic cartridge 1040. As another example, a user may deform all of the blisters of the blister array 1020 (e.g., simultaneously) to cause the fluid within all of the blisters to be introduced (e.g., simultaneously) into respective inlets of the microfluidic cartridge 1040.

Figure 11:
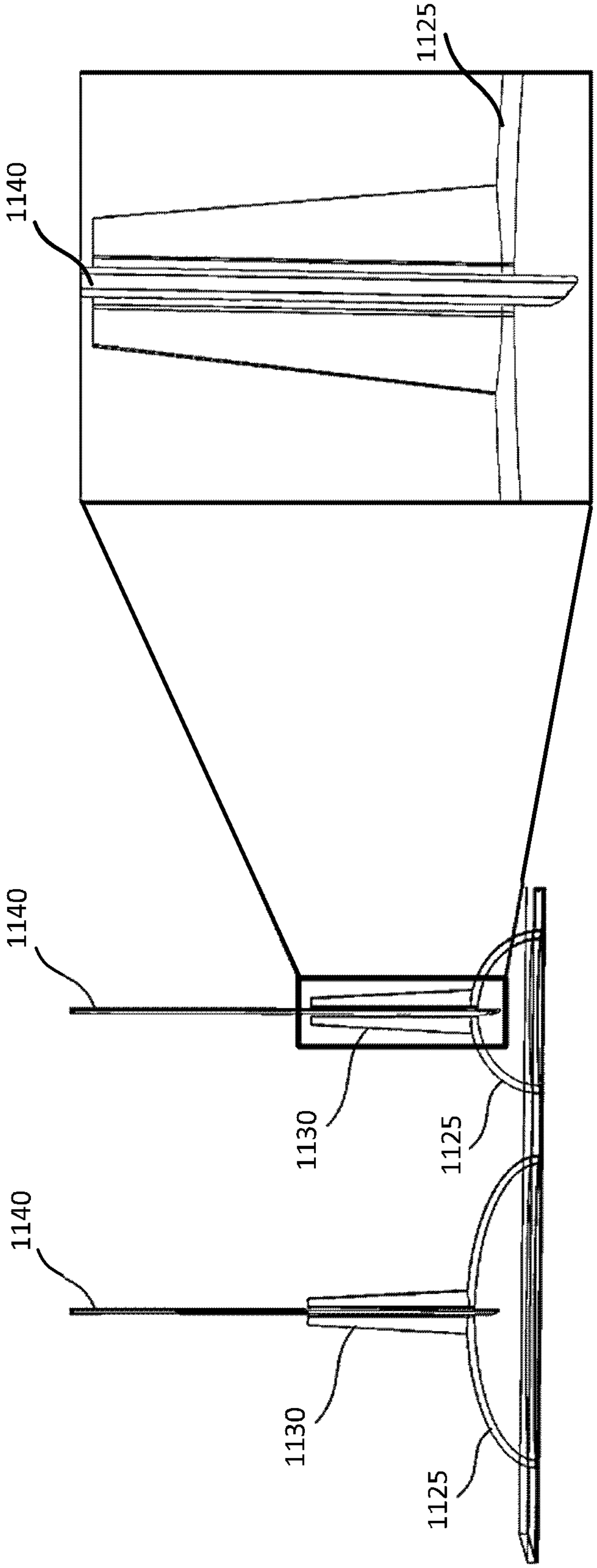
FIG. 11 illustrates an example where fluid is loaded into a plurality of blisters

FIG. 11 illustrates an example where fluid is loaded into a plurality of blisters 1125. In some embodiments, a blister may be loaded with a fluid (e.g., a reagent) by a manufacturer or a user (after the blisters of the blister array have been sealed with one or more deformable seals). In some embodiments, the blister array may then be inverted such that the dispensing tips of the blister array face upward, as illustrated in FIG. 11. Referencing FIG. 11, dispensing needles 1140 may be inserted into the blisters 1125 via the dispensing tips 1130. In some embodiments, the dispensing needles 1140 may be selected to have an outside diameter that is small enough to allow the dispensing needles 1140 to be inserted into the dispensing tips 1130 and still allow gas (e.g., air) within the blisters to be vented as the blisters are filled with fluid from the dispensing needles 1140. Inverting the blister array may facilitate the venting of the gas from the blisters as the blisters are filled. Each of the dispensing needles 1140 may be coupled to a supply lumen containing a desired fluid. After the dispensing needles 1140 have been inserted into the appropriate blisters 1125, the dispensing needles 1140 may load the blisters 1125 with a desired volume of fluid. Once the blisters have been filled, the blister base may be snapped onto the blister array to seal the dispensing tips 1130. In some embodiments, a blister may be loaded via a different pathway (e.g., a dedicated port that is separate from the dispensing tip).

In some embodiments, a blister array may include blisters with a maximum storage volume of 50 μL. However, a manufacturer may opt to load an amount smaller than the maximum storage volume. For example, the manufacturer may choose to load blisters with 20 μL to 30 μL of fluid.

Figure 12A:
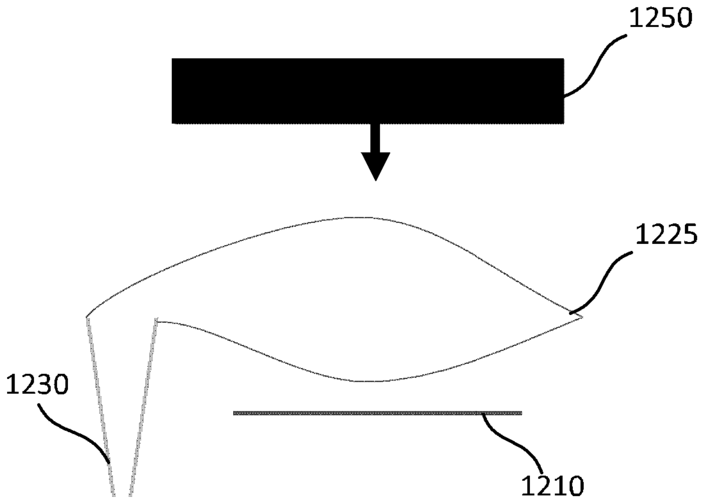
FIGS. 12A-12B illustrate additional examples of blisters.
Figure 12B:
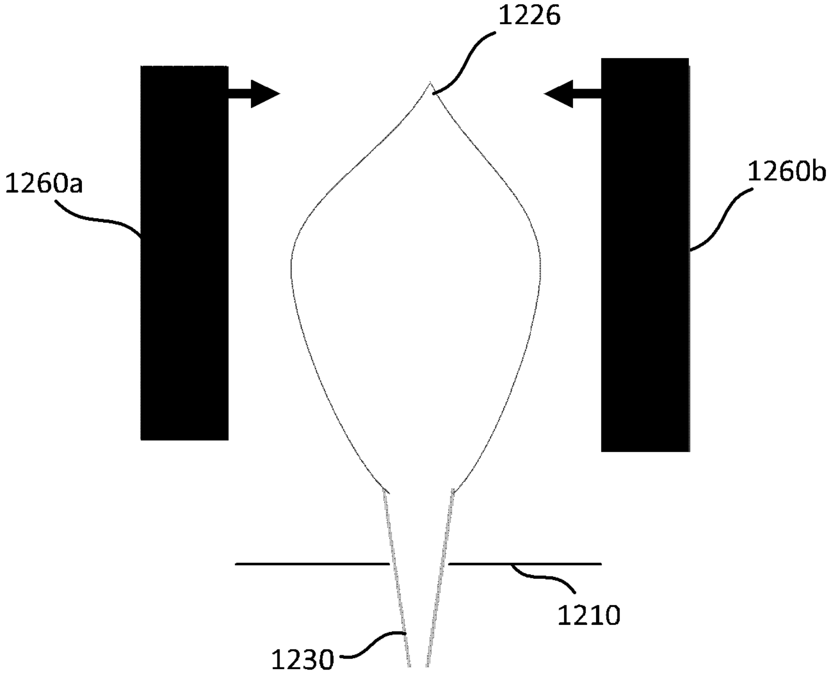

FIGS. 12A-12B illustrate additional examples of blisters 1225 and 1226. Rather than having a reservoir defined by a cavity in a surface of a substrate of a reagent cartridge and a deformable seal overlaying the cavity, the example blisters 1225 and 1226 in FIGS. 12A-12B have reservoirs that are defined entirely by deformable materials. As such, these blisters have a larger total surface area of deformable materials when compared to the blisters **925*a*-925*c* illustrated in FIGS. 9A-9B. This may result in an increased ability to displace fluid from the blisters 1225 and 1226 when the deformable material is deformed, making it easier to displace all or most of the fluid inside the blisters. FIG. 12A illustrates an example of a blister that is oriented substantially parallel to a plane of a substrate surface 1210 of a reagent cartridge. While only one blister is illustrated, an entire blister array is contemplated where one or all of the blisters are configured similar to the blister 1225. As illustrated by the arrow, an element 1250 (e.g., an engaging element of a loading dock) may be advanced toward the blister 1225 to push it against the substrate surface 1210 and thereby displace the fluid therein and thereby cause the fluid to exit the blister 1225 via the dispensing tip 1230. Alternatively, the blister 1225 may be manually squeezed by a user for the same effect. FIG. 12B illustrates an example of a blister that is oriented substantially perpendicular to a plane of a substrate surface 1210 of a reagent cartridge. While only one blister is illustrated, an entire blister array is contemplated where one or all of the blisters are configured similar to the blister 1226. As illustrated by the arrows, elements 1260*a* and 1260*b* (e.g., engaging elements of a loading dock) may be advanced from both sides toward the blister 1226 to displace the fluid therein and thereby cause the fluid to exit the blister 1226 via the dispensing tip 1230**.

Figure 13A:
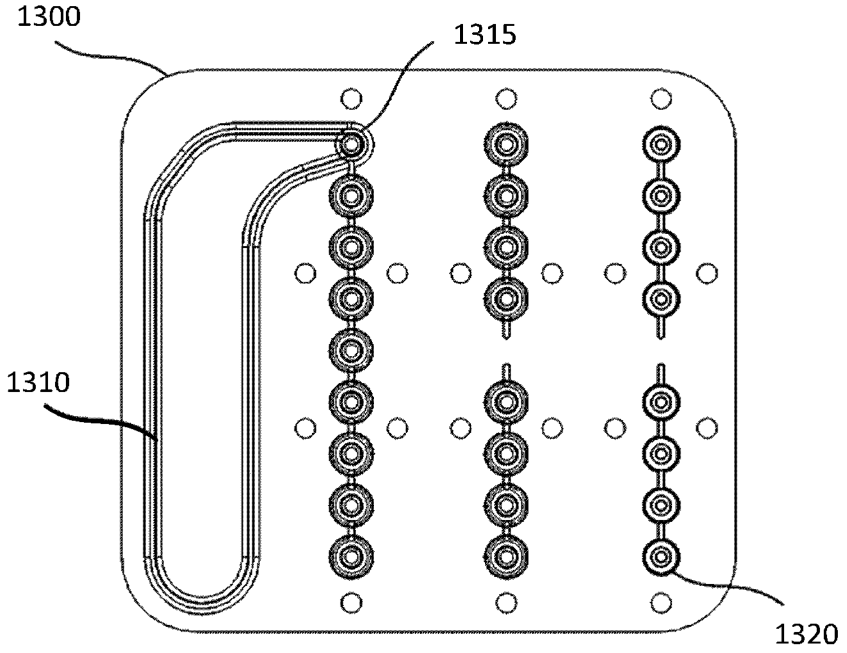
FIGS. 13A-13B illustrate an example of a reagent cartridge 1300 with a reservoir 1310 for a filler fluid.
Figure 13B:
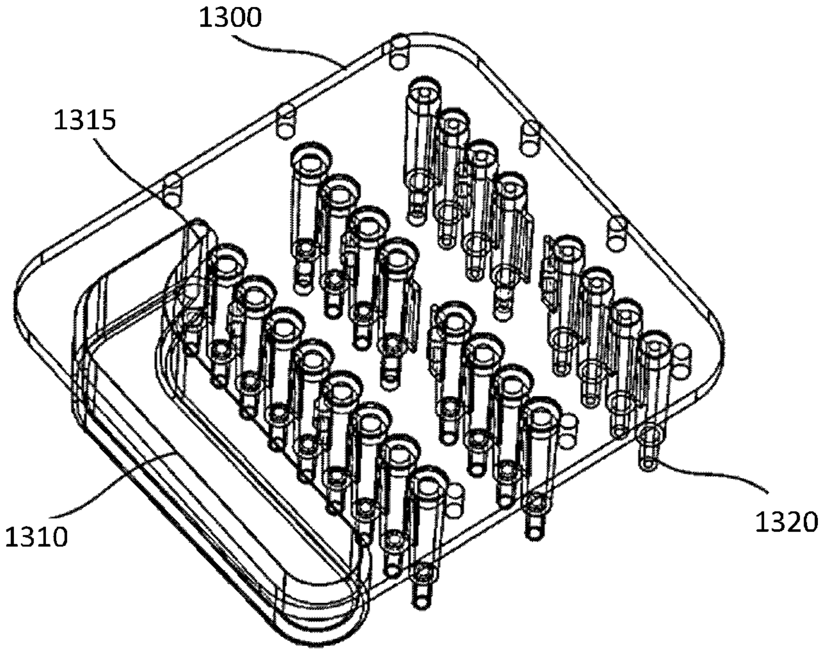

FIGS. 13A-13B illustrate an example of a reagent cartridge 1300 with a reservoir 1310 for a filler fluid. The filler fluid may be flowed into a microfluidic device, and may function as a medium (e.g., in which reactions or assays occur). In some embodiments, the filler fluid may be an oil. In some embodiments, the filler fluid may be an oil mixed with one or more other components (e.g., a surfactant). The example reagent cartridge 1300 includes an filler-fluid dispensing tip 1315 through which an oil may be flowed into a microfluidic device. In some embodiments, the reagent cartridge 1300 may be pre-filled by a manufacturer with reagents within pipette tips 1320 and the reservoir 1310 may be left unfilled. In these embodiments, a user may, after aligning the reagent cartridge over a microfluidic device, introduce a volume of filler fluid into the reservoir 1310. The reservoir 1310 and the filler-fluid dispensing tip 1315 may be configured such that gravity causes the filler fluid to exit the reservoir 1310 via the filler-fluid dispensing tip 1315. In some embodiments, there may be a funnel between the reservoir 1310 and the filler-fluid dispensing tip 1315 to help guide the filler fluid in its exit. The filler-fluid dispensing tip 1315 may be aligned such that the microfluidic device receives the filler fluid into a respective receptacle of the microfluidic device so that the filler fluid can be flowed within the microfluidic device. In some embodiments, the reagent cartridge 1300 may be pre-filled by a manufacturer with reagents within pipette tips 1320 and also with a filler fluid within the reservoir 1310. In these embodiments, the filler-fluid dispensing tip 1315 may include a seal at an opening of the filler-fluid dispensing tip 1315 (e.g., a seal that may be movable or pierceable when the reagent cartridge 1300 is positioned appropriately with respect to a microfluidic device.

In some embodiments, various components of the different embodiments described herein may be manufactured using injection-molding processes. Such processes may result in low-cost parts, and may make it cost-effective for the reagent cartridge is to be used as disposable consumables.

FIG. 14 illustrates an example method 1400 for transferring reagents to a microfluidic device (e.g., a microfluidic cartridge). The method may begin at step 1410, where a reagent cartridge is positioned over a microfluidic device, wherein the reagent cartridge comprises: a pipette shell comprising a plurality of pipette tips, wherein each pipette tip has a first opening and a second opening; and a plunger body comprising: a plurality of plungers, and a connector body configured to couple the plurality of plungers; wherein the plunger body is configured to be fixed to the pipette shell; and the microfluidic device comprises a first inlet opening that is fluidly coupled to a first reservoir of the microfluidic device; wherein positioning the reagent cartridge comprises aligning a first pipette tip of the plurality of pipette tips with the first inlet opening such that the first inlet opening is configured to receive a first fluid from the first pipette tip. At step 1420, a first plunger associated with the first pipette tip may be actuated to cause a first volume of the first fluid to be displaced from the first pipette tip into the first reservoir via the first inlet opening. Particular embodiments may repeat one or more steps of the method of FIG. 14, where appropriate. Although this disclosure describes and illustrates particular steps of the method of FIG. 14 as occurring in a particular order, this disclosure contemplates any suitable steps of the method of FIG. 14 occurring in any suitable order. Moreover, although this disclosure describes and illustrates an example method for transferring reagents to a microfluidic device, including the particular steps of the method of FIG. 14, this disclosure contemplates any suitable method for transferring reagents to a microfluidic device, including any suitable steps, which may include all, some, or none of the steps of the method of FIG. 14, where appropriate. Furthermore, although this disclosure describes and illustrates particular components, devices, or systems carrying out particular steps of the method of FIG. 14, this disclosure contemplates any suitable combination of any suitable components, devices, or systems carrying out any suitable steps of the method of FIG. 14.

Figure 15:
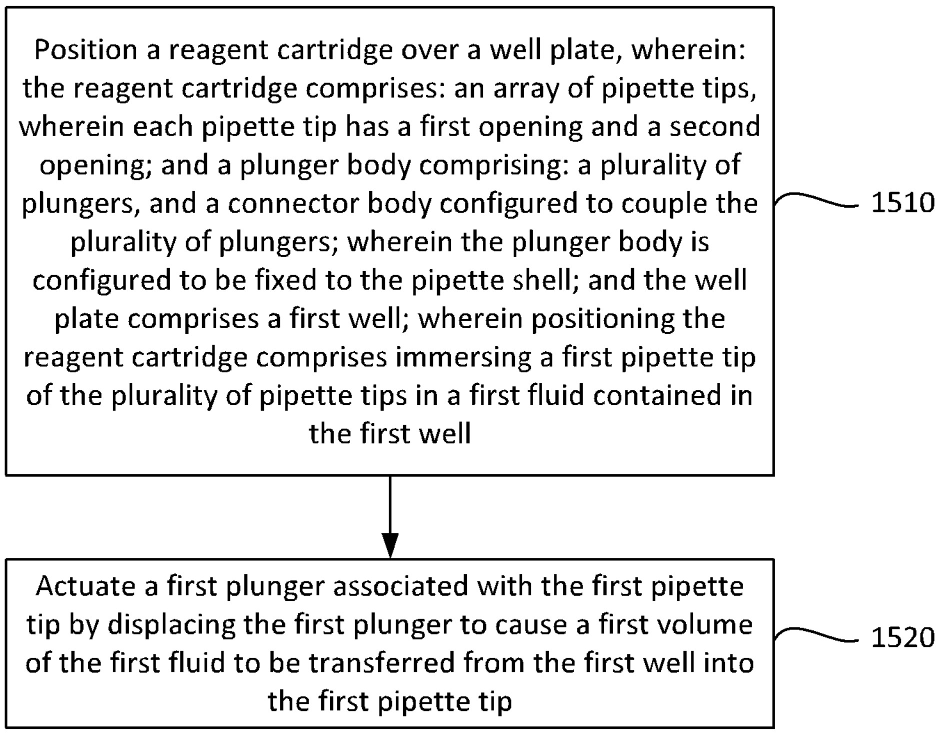
FIG. 15 illustrates an example method for loading reagents onto a reagent cartridge.

FIG. 15 illustrates an example method 1500 for loading reagents onto a reagent cartridge. The method may begin at step 1510, where a reagent cartridge is positioned over a well plate, wherein the reagent cartridge comprises: an array of pipette tips, wherein each pipette tip has a first opening and a second opening; and a plunger body comprising: a plurality of plungers, and a connector body configured to couple the plurality of plungers; wherein the plunger body is configured to be fixed to the pipette shell; and the well plate comprises a first well; wherein positioning the reagent cartridge comprises immersing a first pipette tip of the plurality of pipette tips in a first fluid contained in the first well. At step 1520, the first plunger associated with the first probative may be actuated to cause a first volume of the first fluid to be transferred from the first well into the first pipette tip. Particular embodiments may repeat one or more steps of the method of FIG. 15, where appropriate. Although this disclosure describes and illustrates particular steps of the method of FIG. 15 as occurring in a particular order, this disclosure contemplates any suitable steps of the method of FIG. 15 occurring in any suitable order. Moreover, although this disclosure describes and illustrates an example method for loading reagents onto a reagent cartridge, including the particular steps of the method of FIG. 15, this disclosure contemplates any suitable method for loading reagents onto a reagent cartridge, including any suitable steps, which may include all, some, or none of the steps of the method of FIG. 15, where appropriate. Furthermore, although this disclosure describes and illustrates particular components, devices, or systems carrying out particular steps of the method of FIG. 15, this disclosure contemplates any suitable combination of any suitable components, devices, or systems carrying out any suitable steps of the method of FIG. 15.

FIG. 16 illustrates an example method 1600 for transferring reagents to a microfluidic cartridge. The method may begin at step 1610, where a reagent cartridge is positioned over a microfluidic device, wherein the reagent cartridge comprises: a substrate comprising: one or more blisters, wherein each blister comprises a fluid reservoir configured to hold a volume of fluid; and one or more dispensing tips, each dispensing tip comprising a pathway that is fluidly coupled to a blister, wherein a fluid is capable of being displaced from or loaded into the blister via the dispensing tip; and one or more deformable seals fixed to the substrate and overlaid on the one or more blisters for sealing the volumes of fluid within the one or more blisters; and the microfluidic device comprises a first inlet opening that is fluidly coupled to a first reservoir of the microfluidic device; wherein positioning the reagent cartridge comprises aligning a first dispensing tip of the one or more dispensing tips with the first inlet opening such that the first inlet opening is configured to receive a first fluid from a first blister fluidly coupled to the first dispensing tip. At step 1620, one or more of the deformable seals may be displaced to cause a first volume of the first fluid to be displaced from the first blister into the first reservoir via the first inlet opening. Particular embodiments may repeat one or more steps of the method of FIG. 16, where appropriate. Although this disclosure describes and illustrates particular steps of the method of FIG. 16 as occurring in a particular order, this disclosure contemplates any suitable steps of the method of FIG. 16 occurring in any suitable order. Moreover, although this disclosure describes and illustrates an example method for transferring reagents to a microfluidic cartridge, including the particular steps of the method of FIG. 16, this disclosure contemplates any suitable method for transferring reagents to a microfluidic cartridge, including any suitable steps, which may include all, some, or none of the steps of the method of FIG. 16, where appropriate. Furthermore, although this disclosure describes and illustrates particular components, devices, or systems carrying out particular steps of the method of FIG. 16, this disclosure contemplates any suitable combination of any suitable components, devices, or systems carrying out any suitable steps of the method of FIG. 16.

Although the processes described herein are described with respect to a certain number of steps being performed in a certain order, it is contemplated that additional steps may be included that are not explicitly shown and/or described. Further, it is contemplated that fewer steps than those shown and described may be included without departing from the scope of the described embodiments (i.e., one or some of the described steps may be optional). In addition, it is contemplated that the steps described herein may be performed in a different order than that described.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

For all flowcharts herein, it will be understood that many of the steps can be combined, performed in parallel or performed in a different sequence without affecting the functions achieved.

What is claimed is:

1. A method of transferring reagents to a microfluidic cartridge comprising: positioning a reagent cartridge over a microfluidic device, wherein:

the reagent cartridge comprises: a substrate comprising: one or more blisters, wherein each blister comprises a fluid reservoir configured to hold a volume of fluid; and one or more dispensing tips, each dispensing tip comprising a pathway that is fluidly coupled to a blister, wherein a fluid is configured to be displaced from or loaded into the blister via the dispensing tip; and one or more deformable seals fixed to the substrate and overlaid on the one or more blisters, such that the one or more deformable seals are configured to seal the volumes of fluid within the one or more blisters; and the microfluidic device comprises a first inlet opening that is fluidly coupled to a first reservoir of the microfluidic device;

wherein positioning the reagent cartridge comprises aligning a first dispensing tip of the one or more dispensing tips with the first inlet opening such that the first inlet opening is configured to receive a first fluid from a first blister fluidly coupled to the first dispensing tip; and displacing one or more of the deformable seals, such that the one or more deformable seals are configured to cause a first volume of the first fluid to be displaced from the first blister into the first reservoir via the first inlet opening.

2. The method of claim 1, wherein the blisters comprise hollow cavities in a surface of the substrate.

3. The method of claim 1, further comprising removing a base from the reagent cartridge, wherein the base is configured to engage one or more openings of the one or more dispensing tips and form a seal.

4. The method of claim 3, wherein the base comprises one or more recessed portions configured to house at least a portion of the dispensing tips.

5. The method of claim 4, wherein the base further comprises one or more sealing pads disposed within the one or more recessed portions, wherein each sealing pad is configured to engage and seal an opening of a respective dispensing tip.

6. The method of claim 1, wherein the one or more deformable seals comprises a thermoplastic film.

7. The method of claim 1, wherein the one or more deformable seals comprises a thermoplastic elastomer film.

8. The method of claim 1, wherein the one or more deformable seals comprises a coating configured to reduce gas permeability.

9. The method of claim 1, wherein the one or more deformable seals are fixed to the substrate by laser welding or thermal lamination.

10. The method of claim 1, wherein the one or more deformable seals are fixed to the substrate using an adhesive.

11. The method of claim 1, wherein the one or more deformable seals are fixed to the substrate using a pressure-sensitive adhesive.

12. The method of claim 1, wherein the substrate comprises a plurality of blisters organized in a blister array, and wherein the one or more deformable seals comprise a single deformable film that overlays the blister array.

13. The method of claim 12, wherein the plurality of blisters comprises a first blister having a first fluid reservoir and a second blister having a second fluid reservoir.

14. The method of claim 1, further comprising:

inserting a dispensing needle into an opening of a first dispensing tip coupled to a first blister;

dispensing a first volume of fluid into a first blister via the dispensing needle.

15. The method of claim 1, wherein displacing the one or more deformable seals comprises applying a first plunger end against the one or more deformable seals.

16. The method of claim 1, wherein the microfluidic device is a cartridge.

17. The method of claim 15, wherein the first plunger end is configured to conform to a shape and size of the fluid reservoir of the first blister.

18. The method of claim 15, wherein the substrate comprises a plurality of blisters, wherein the plurality of blisters comprises a first blister having a first fluid reservoir and a second blister having a second fluid reservoir, and wherein the first plunger end is configured to conform to a shape and size of the fluid reservoir of the first blister and a second plunger end is configured to conform to a shape and size of a fluid reservoir of the second blister.

19. A method of transferring reagents to a microfluidic cartridge comprising: displacing a first deformable seal of a reagent cartridge, wherein the reagent cartridge comprises:

a substrate comprising:

one or more blisters, wherein each blister comprises a fluid reservoir configured to hold a volume of fluid; and one or more dispensing tips, each dispensing tip comprising a pathway that is fluidly coupled to a blister, wherein a fluid is configured to be displaced from or loaded into the blister via the dispensing tip; and one or more deformable seals fixed to the substrate and overlaid on the one or more blisters, such that the one or more deformable seals are configured to seal the volumes of fluid within the one or more blisters;

wherein when displacing the first deformable seal, the deformable seal is configured to cause a first volume of a first fluid to be displaced from a first blister of the one or more blisters via a first dispensing tip.

20. The method of claim 19, further comprising positioning the reagent cartridge over a microfluidic device, and wherein the first volume of the first fluid is configured to be displaced into microfluidic device via the first inlet opening.

21. The method of claim 19, wherein the first volume of the first fluid is configured to be displaced into a first reservoir via the first inlet opening.

* * * * *